United States Patent [19]
Gigioli, Jr.

[11] Patent Number: 5,789,735
[45] Date of Patent: Aug. 4, 1998

[54] OPTICAL SYSTEM FOR REFORMATTING A LINE IMAGE

[75] Inventor: George W. Gigioli, Jr., Andover, Mass.

[73] Assignee: Raytheon Company, Lexington, Mass.

[21] Appl. No.: 543,446

[22] Filed: Oct. 16, 1995

[51] Int. Cl.$^6$ ............................................. H01J 40/14
[52] U.S. Cl. ........................................ 250/208.1; 250/216
[58] Field of Search ............................. 250/208.1, 201.8, 250/216, 201.3, 226; 348/143; 382/316; 359/363–364, 372

[56] References Cited

U.S. PATENT DOCUMENTS

| | | | |
|---|---|---|---|
| 2,627,199 | 2/1953 | O'Brien | 88/1 |
| 3,786,181 | 1/1974 | Pear . | |
| 4,080,633 | 3/1978 | Starkweather | 358/293 |
| 4,114,037 | 9/1978 | Westwood | 250/216 |
| 4,335,305 | 6/1982 | Seachman | 250/216 |
| 4,348,593 | 9/1982 | Seachman | 250/578 |
| 4,348,953 | 9/1982 | Seachman | 250/208.1 |
| 4,377,753 | 3/1983 | Mir | 250/578 |
| 4,383,170 | 5/1983 | Takagi et al. | 250/216 |
| 4,970,403 | 11/1990 | Krasutsky | 250/216 |
| 4,994,664 | 2/1991 | Veldkamp | 250/216 |
| 5,128,789 | 7/1992 | Abramovitz | 359/118 |
| 5,138,359 | 8/1992 | Nagano et al. | 356/406 |
| 5,289,553 | 2/1994 | Ortiz, Jr. et al. | 385/74 |
| 5,321,248 | 6/1994 | Sensui | 250/201.8 |
| 5,530,236 | 6/1996 | Sensui | 250/201.8 |

FOREIGN PATENT DOCUMENTS 0 140 529 A1  9/1983  European Pat. Off. .
0 510 267 A1  10/1992  European Pat. Off. .

OTHER PUBLICATIONS

Veldkamp, W.B., et al., "Binary Optics," *Scientific American*, pp. 92–97, (May 1992).

Casasent, D., et al., "Real–time deformation invariant optical pattern recognition using coordinate transformations," *Applied Optics*, 26(5):938–942, (Mar. 1, 1987).

Bryngdahl, O., "Geometrical transformations in optics," *Journal of the Optical Society of America*, 64(8):1092–1099, (Aug. 1974).

Davidson, N., et al., "Optical coordinate transformations," *Applied Optics* 31(8):1067–1073, (Mar. 10, 1992).

Swanson, G.J., Technical Report 854 entitled "Binary Optics Technology: The Theory and Design of Multi–level Diffractive Optical Elements," Massachusetts Institute of Technology, Lincoln Laboratory, pp. 1–47, (Aug. 14, 1989).

*Primary Examiner*—Que Le
*Attorney, Agent, or Firm*—W. C. Schubert; G. H. Lenzen, Jr.

[57] ABSTRACT

An optical system is coupled between a one-dimensional line image and a two-dimensional detector array. The line image is segmented and reimaged onto respective image cells of the detector array, each image cell being a row of detector cells. The optical system positionally segments the line image into lengths of a predetermined length. The predetermined length of the segments optically fit within the width of image cells within the array. The optical system reimages the line segments to image cell positions on the detector array. The optical system preferably employs diffractive (binary) optic elements.

52 Claims, 12 Drawing Sheets

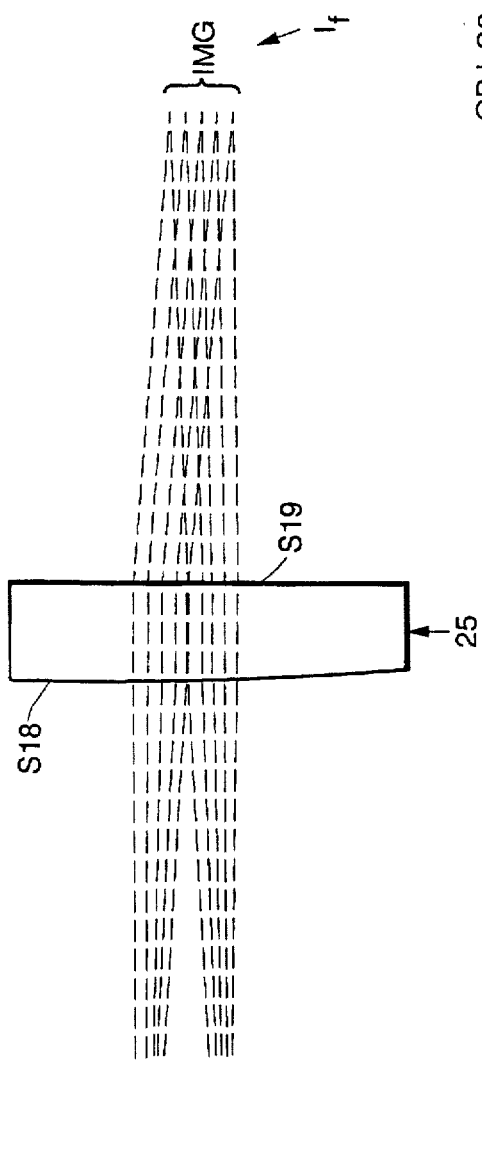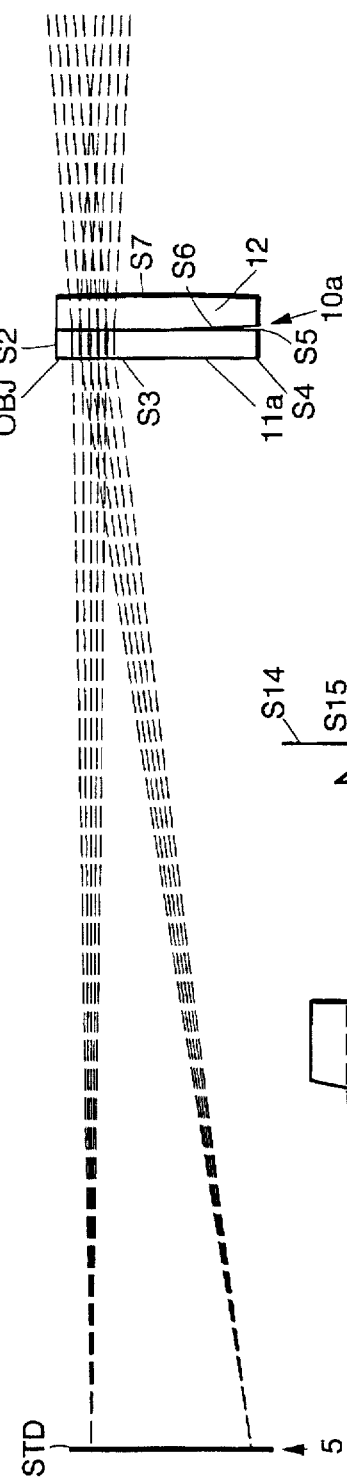

Level 1
POSITION 1
WAVE ABERRATION

WAVELENGTH:3800.0 NM
FLD (0.00 MAX,(0.0, 0.
DEFOCUSING: 0.000000 IN.
CONTOUR INTERVAL: 0.50 WAVE
MIN / MAX:-0.84 /1.61 WAVE

Level 1
POSITION 2
WAVE ABERRATION

WAVELENGTH:3800.0 NM
FLD (0.00 MAX,(0.0, 0.
DEFOCUSING: 0.000000 IN.
CONTOUR INTERVAL: 0.50 WAVE
MIN / MAX:-0.44 /1.77 WAVE

| Level 2 POSITION 1 WAVE ABERRATION | WAVELENGTH:3800.0 NM<br>FLD (0.00 MAX,(0.0, 0.<br>DEFOCUSING: 0.000000 IN.<br>CONTOUR INTERVAL: 0.25 WAVE<br>MIN / MAX:-0.84 /1.61 WAVE |

| Level 2 POSITION 2 WAVE ABERRATION | WAVELENGTH:3800.0 NM<br>FLD (0.00 MAX,(0.0, 0.<br>DEFOCUSING: 0.000000 IN.<br>CONTOUR INTERVAL: 0.25 WAVE<br>MIN / MAX:-0.44 /1.77 WAVE |

Level 3 POSITION 1 WAVE ABERRATION
WAVELENGTH:3800.0 NM
FLD (0.00 MAX,(0.0, 0.
DEFOCUSING: 0.000000 IN.
CONTOUR INTERVAL: 0.13 WAVE
MIN / MAX:-0.84 /1.61 WAVE Level 3 POSITION 2 WAVE ABERRATION
WAVELENGTH:3800.0 NM
FLD (0.00 MAX,(0.0, 0.
DEFOCUSING: 0.000000 IN.
CONTOUR INTERVAL: 0.13 WAVE
MIN / MAX:-0.44 /1.77 WAVE

| Level 4 | WAVELENGTH:3800.0 NM |
| POSITION 1 | FLD (0.00 MAX,(0.0, 0. |
| | DEFOCUSING: 0.000000 IN. |
| WAVE ABERRATION | CONTOUR INTERVAL: 0.06 WAVE |
| | MIN / MAX:-0.84 /1.61 WAVE |

| Level 4 | WAVELENGTH:3800.0 NM |
| POSITION 2 | FLD (0.00 MAX,(0.0, 0. |
| | DEFOCUSING: 0.000000 IN. |
| WAVE ABERRATION | CONTOUR INTERVAL: 0.06 WAVE |
| | MIN / MAX:-0.44 /1.77 WAVE |

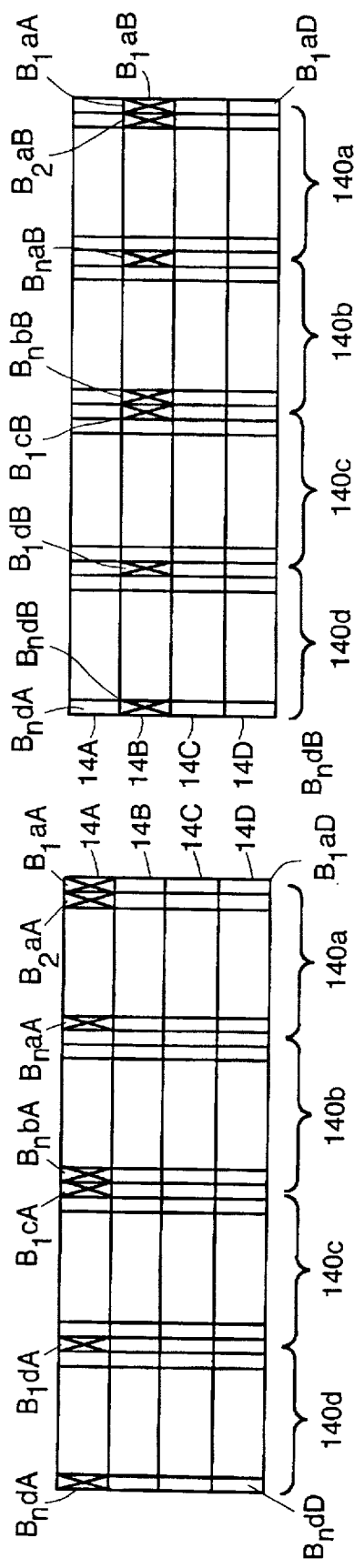
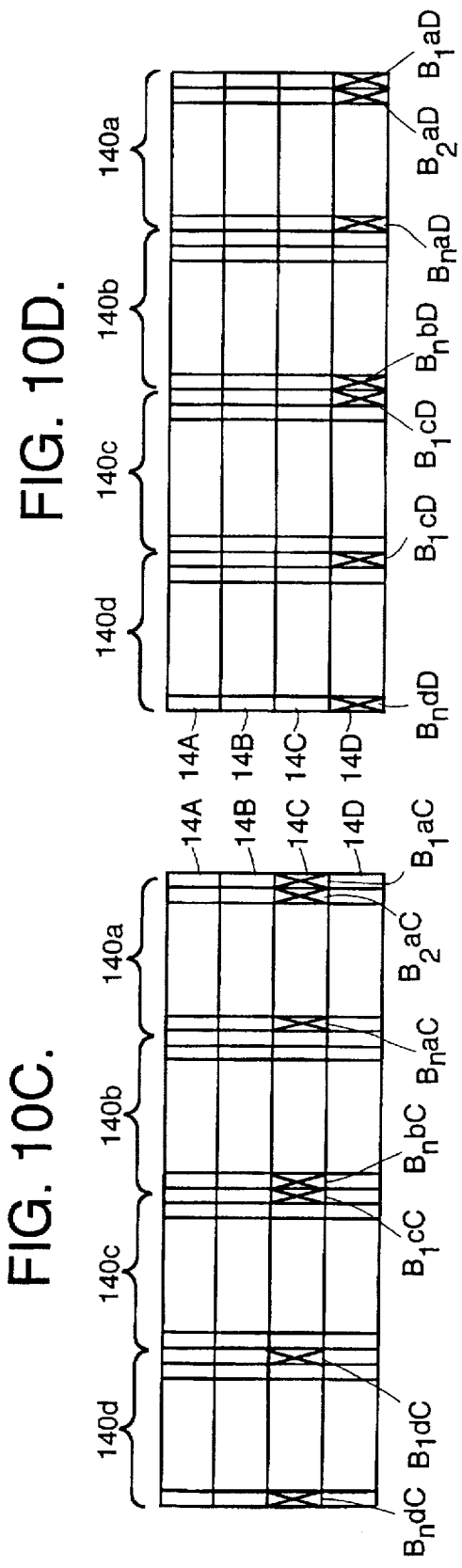
FIG. 10A.
FIG. 10B.
FIG. 10C.
FIG. 10D.

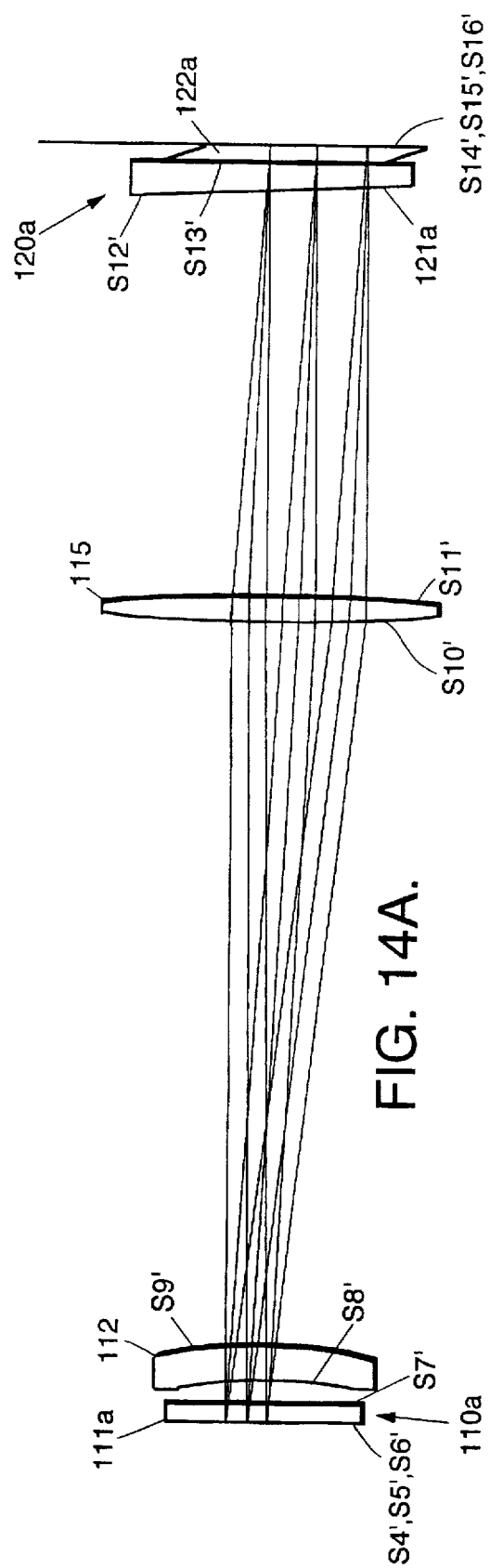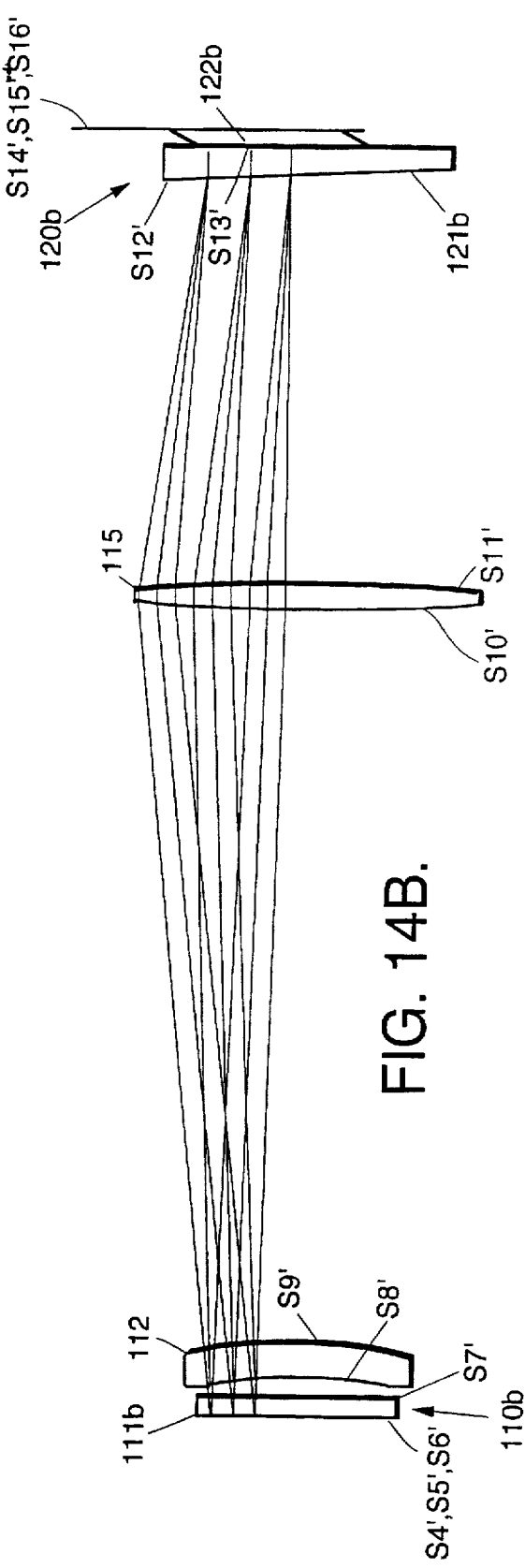

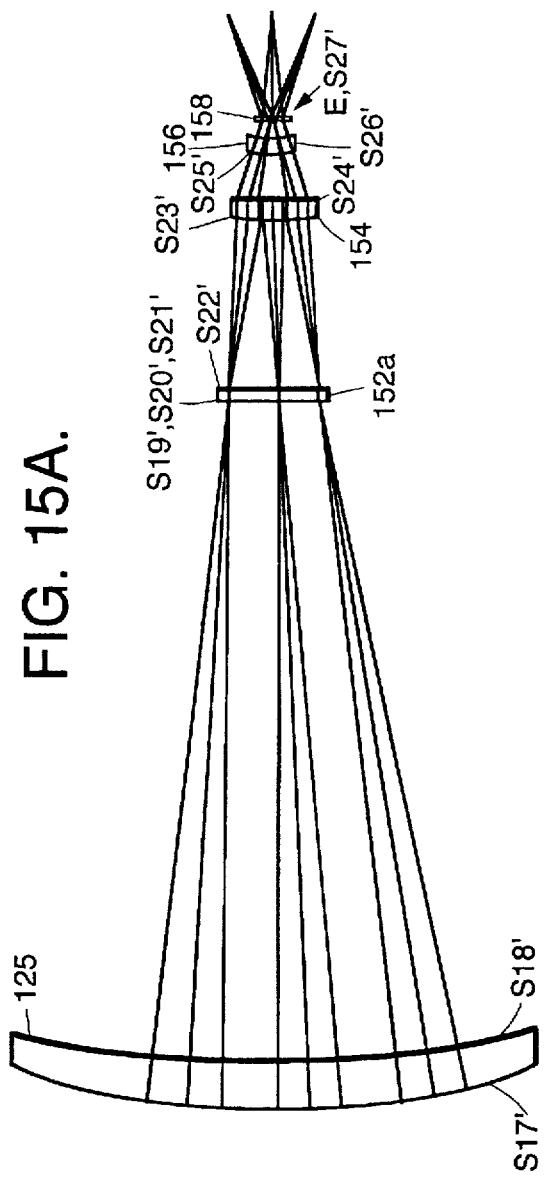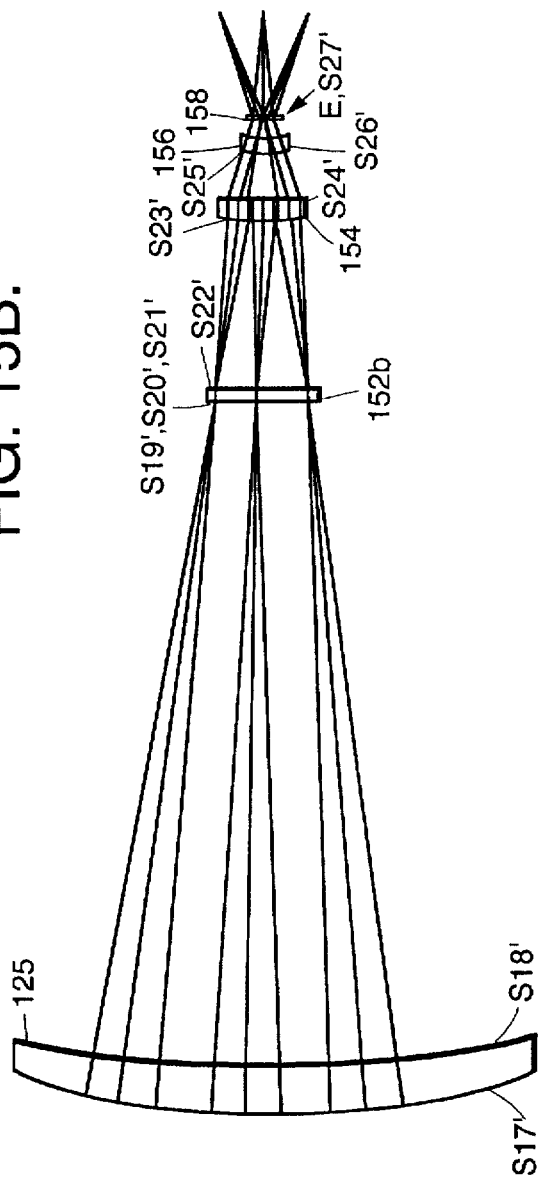

OPTICAL SYSTEM FOR REFORMATTING A LINE IMAGE

Related Application

This application is related to co-pending application U.S. Ser. No. 08/281,933 filed Jul. 28, 1994, now abandoned the teachings of which are incorporated herein by reference in their entirety.

BACKGROUND OF THE INVENTION

A line image can be used to scan a multi-dimensional image source. Light from the line image may be measured and quantified by a detection system. A typical line image can extend for a length of several thousand pixels in the detection system.

Line image detector systems typically employ linear arrays of detectors. Although linear detector arrays of various lengths are available, quality detector arrays in lengths of more than about one thousand pixels are very difficult to manufacture. The use of a detector array having fewer pixels than can be resolved in a line image reduces the resulting detection system resolution. Hence, a typical line image detector system must tradeoff quality or cost for resolution.

Line image detection systems are frequently used to scan an image source in the infrared (IR) frequency band. The use of line detectors in an infrared system places additional cooling demands on the detection system. To achieve acceptable signal-to-noise ratio levels, the detectors must be cooled to a temperature of about 70°–80° K. As the length of a line detector increases, it becomes more difficult to cool and keep the line detector at a constant temperature across the length of the line detector. In addition, the materials that are used to fabricate IR detector arrays have disparate Coefficients of Thermal Expansion (CTE), which in most cases limits the maximum dimension of an array to about 12 mm. Although the cooling problem is most acute for infrared detectors, it can also be a problem for other line detectors.

SUMMARY OF THE INVENTION

Preferred embodiments of the invention solve the problems of the prior art by reformatting a line image onto a non-linear detector array.

An apparatus according to the invention employs at least one binary optic element, which is placed in an optical system between a one-dimensional intermediate line image and a two-dimensional detector cell array. The line image is segmented and reimaged onto the detector array by the apparatus in such a way that data read out of the array can be used to reconstruct the line image.

A first optical subsystem segments the image into smaller lengths that will fit within the width of the two-dimensional detector array. The first optical subsystem redirects imaging bundles for each segment onto a separate subaperture of a second optical subsystem. Each subaperture of the second optical subsystem reimages the line segments to respective cells of the detector array.

In preferred embodiments of the invention, planar optical elements such as prisms or binary optics perform the segmenting and reformatting functions. Preferably, the first and the second optical subsystem comprise binary optics or other elements, such as off-axial lenses, for correcting the wavefront error introduced as a result of dispersion from the planar elements.

In a preferred embodiment of the invention, each reimaged line segment is registered to a respective exit pupil of the system. In another preferred embodiment of the invention, each reimaged line segment is directed through a common exit pupil of the system by an optical combiner. After exiting the exit pupil, the reimaged line segments impinge on the detector array. The use of a common exit pupil is particularly advantageous when infrared light is being detected because a single cold stop can be disposed at the common exit pupil.

An apparatus according to the invention permits Time-Delay-and-Integration (TDI) by reformatting multiple line images onto the detector array. Successive lines in the two-dimensional detector array receive light from successive line image segments at distinct time intervals.

The dispersive nature of diffractive optics can be further exploited to realize an imaging spectrometer. The dispersion inherent in diffractive optics is used in a preferred embodiment of the invention to produce a dispersed image of the line image on the detector array. Successive lines in the detector array correspond to different wavelengths of light from the line image. In other words, a single segment of the line image is mapped onto several successive lines in the detector array, where each of these lines detects light of a different wavelength.

Alternatively, detector systems according to the invention can employ other than two-dimensional detector arrays. In particular, image cells can be disjointed and positioned anywhere in three-dimensional space.

BRIEF DESCRIPTION OF THE DRAWINGS

The above and other features of the invention, including various novel details of construction and combinations of parts, will now be more particularly described with reference to the accompanying drawings and pointed out in the claims. It will be understood that the particular optical image reformatter embodying the invention is shown by way of illustration only and not as a limitation of the invention. The principles and features of this invention may be employed in varied and numerous embodiments without departing from the scope of the invention.

FIGS. 5A–5C are enlarged schematic diagrams of the subaperture of FIG. 3A.

FIGS. 10A–10D are schematic diagrams of an intermediate line image at discrete times $t_0$, $t_1$, $t_2$, $t_3$, respectively.

FIGS. 14A-14B are enlarged schematic diagrams of the first optical subsystem 110a, 110b, collecting lens 115 and second optical subsystem 120a, 120b of FIGS. 13A-13B, respectively.

FIGS. 15A-15B are enlarged schematic diagrams of the field lens 125 and the optical combiners 150a, 150b of FIGS. 13A-13B, respectively.

DETAILED DESCRIPTION OF PREFERRED EMBODIMENTS OF THE INVENTION

Figure 1:
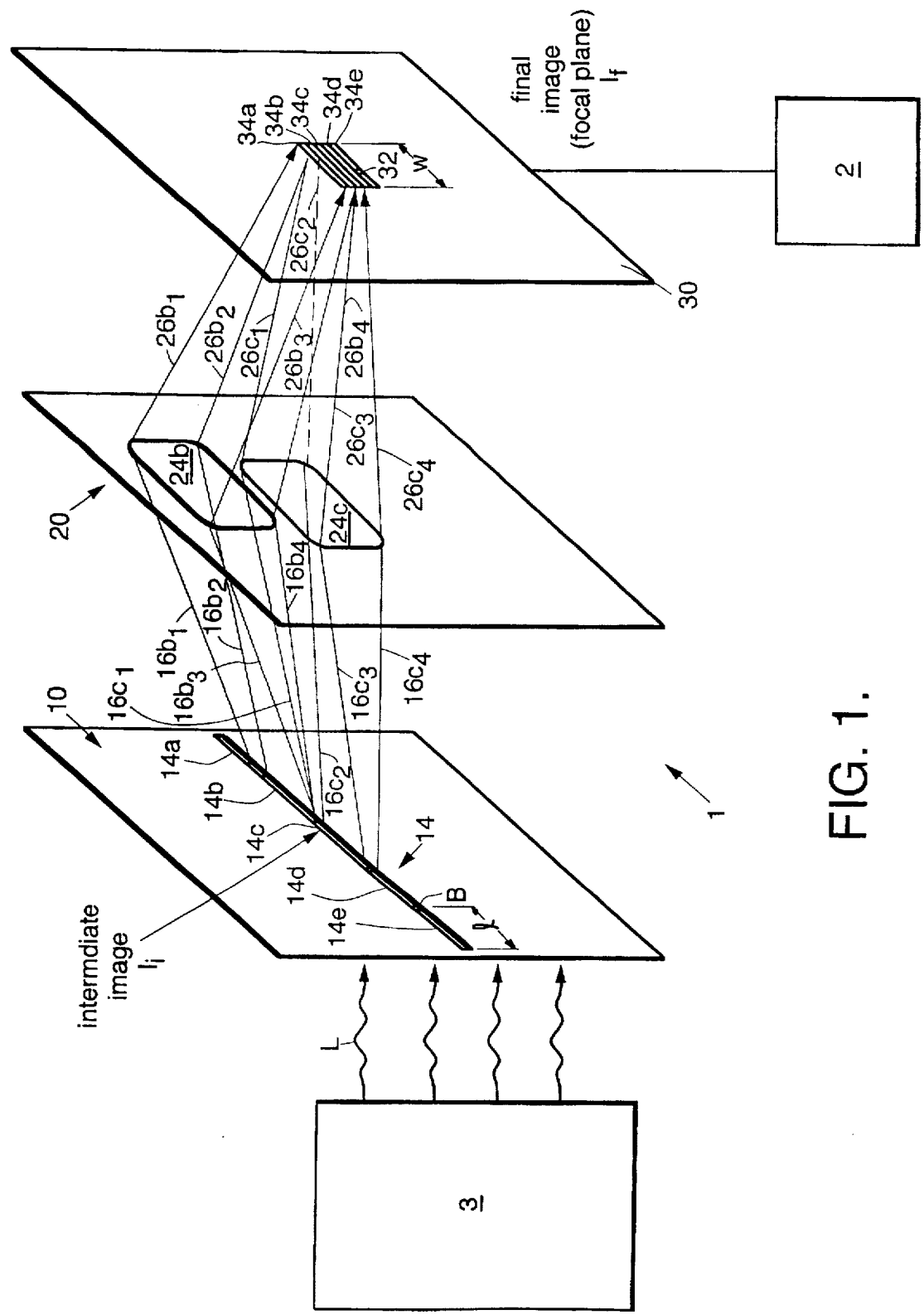
FIG. 1 is a block diagram of an apparatus according to the invention.

FIG. 1 is a block diagram of an apparatus according to the invention. Image light L from an image source 3 having an objective lens, such as a telescope, is processed by an optical system 1. Preferably, the apparatus is aircraft or satellite based and the image source 3 provides a view of ground terrain below the apparatus. The apparatus reformats a line image or view of the ground terrain onto an array of detector cells.

From the image light L, an intermediate image $I_i$ is formed. The intermediate image $I_i$ is formed from a plurality of light bundles B positioned serially to form a line image 14. Each light bundle B is a group of light rays that can correspond to a pixel of a line imaging apparatus. In a preferred embodiment of the invention, the optical system 1 is coupled between the image source 3 and a two-dimensional detector cell array 30. The optical system 1 preferably has at least one binary optic element. In particular, there are two binary optical subsystems 10, 20. The apparatus of the invention segments and reimages the line image 14 onto respective row image cells 34a, . . . , 34e of the detector array 30. The detector array 30 is read and the light intensity data is processed by a data processor 2, which can reconstruct the line image.

Figure 2:
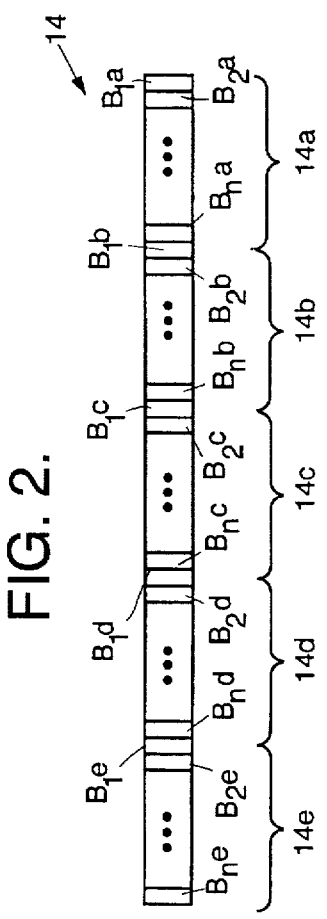
FIG. 2 is a schematic diagram of the line image 14 of FIG. 1.

FIG. 2 is a schematic diagram of the line image 14 of FIG. 1. The optical system 1 positionally segments the line image 14 into a plurality of image segments 14a, . . . , 14e of a predetermined length 1. Each image segment 14a, . . . , 14e can contain a plurality of imaging bundles $B_1$. . . $B_n$. As illustrated, segment 14a includes n bundles $B_1a$ . . . $B_na$, segment 14b includes n bundles $B_1b$ . . . $B_nb$, segment 14c includes n bundles $B_1c$ . . . $B_nc$, segment 14d includes n bundles $B_1d$ . . . $B_nd$, and segment 14e includes n bundles $B_1e$ . . . $B_ne$. Each light bundle corresponds to a pixel or detector cell in the detector array.

Returning to FIG. 1, the predetermined length 1 of the segments optically fit within the width w of the image cells 34a, . . . , 34e within the detector array 30. Each image cell 34 preferably contains a plurality of detector cells 32 such as photodetectors, each of which represent a pixel of the detected image. Preferably, each image cell 34 is a row of detector cells 32 of the detector array 30. The optical system 1 reimages the image segments 14a, . . . , 14e to image cell positions 34a, . . . , 34e on the detector array 30. Although FIG. 1 illustrates five image segments 14a, . . . , 14e and five image cells 34a, . . . , 34e, other quantities can be employed.

Preferably, at least one optical element is used to optically reformat the line image 14 into a two-dimensional array 30.

In particular, a first optical subsystem 10 segments the line image 14 into a plurality of image segments 14a, . . . , 14e. A second optical subsystem 20 reimages each of the image segments 14a, . . . , 14e onto a respective image cell 34a, . . . , 34e of the detector array 30. Furthermore, the reimaging is performed in accordance with the original position in the line image 14 of the image segment 14a, . . . , 14e being reimaged. However, the relative locations of the reimaged image segments are not related to the relative locations of the original image segments 14a, . . . , 14e to one another.

The reimaging optical element 20 comprises at least one subaperture optical element 24. As illustrated, each subaperture optical element 24b, 24c is registered to a respective image segment 14b, 14c. Preferably, there are as many subaperture optical elements 24a, . . . , 24e as there are image segments 14a, . . . , 14e in the line image 14.

The optical subsystems 10, 20 preferably comprise binary optic elements. However, the invention does not require the use of binary optics. Conventional optics (e.g., lenses) may be used to practice the invention, but aberration correction is more difficult to achieve using conventional optics than with binary optics. As discussed in more detail below, a particular apparatus of the invention combines conventional refractive optical elements with binary optical elements.

Relative to the line image 14, the focal ratio (i.e., f value) of the subapertures 24 must match the focal ratio of the optical system that forms the intermediate image. By equating the focal ratios, the entire plurality of light bundles forming the intermediate image segment is incident on the subaperture 24 without wastage. Preferably, the focal ratio is between 6 and 10.

A line image 14 having 6,144 pixels 12, each 16 µm long can be reformatted to a 256-by-256 detector cell array 30. The operating wavelength band is preferably centered on 4.0 µm. In particular, the operating wavelength band extends from about 3.4–4.2 µm.

The image cells 34a, . . . , 34e of the detector array 30 are preferably about 25 µm wide. The conjugate ratio is preferably between about 1:1 and 2:1. More specifically, the conjugate ratio is 1.5:1.

Particular details of preferred embodiments of the invention can be obtained by those of ordinary skill in the art using commercially available lens design tools. One such tool is CODE V, a commercially available software package. A listing from CODE V for a particular embodiment of the invention is provided in Appendix A to this application. It will be understood that the input parameters can be modified to yield other effective embodiments of the invention.

Figure 3A:
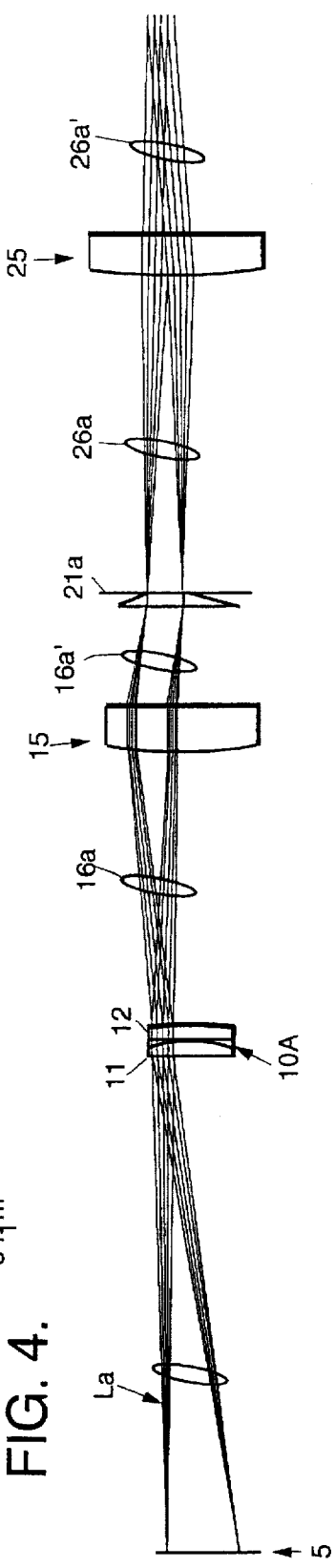
FIGS. 3A–3B are schematic diagrams of the optical components of two subapertures of the optical system 1 of FIG. 1.
Figure 3B:
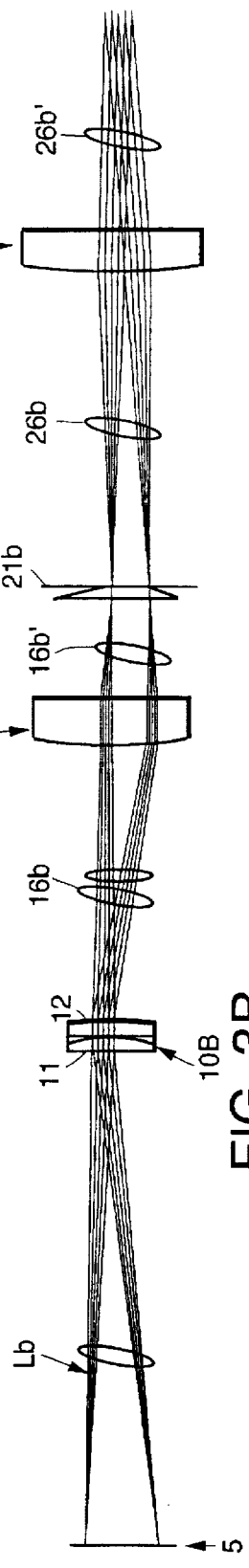

FIGS. 3A-3B are schematic diagrams of the optical components of the subapertures as generated by CODE V. In particular, 1,024 pixels are mapped onto four lines of a 256×256 Charge Coupled Device (CCD) array. One subaperture is required to map each of the lines, thus the entire system requires four subapertures. As illustrated, only one half of the system (i.e., two subapertures) is illustrated because the other half of the system is identical to the illustrated half by virtue of the symmetry of the system. FIG. 3A illustrates a first subaperture and FIG. 3B illustrates a second subaperture.

Light rays La, Lb from the image source 5 form an image at a first optical subsystem 10a, 10b. The image source 5 is the exit pupil of another optical system (e.g., telescope), which is not shown. The light rays 16a, 16b from the respective first optical subsystem 10a, 10b are transmitted through a refractive collecting lens 15 which redirects the light rays 16a', 16b' toward a second optical subsystem 20a, 20b. Together, the first optical subsystem 10a, 10b and the collecting lens 15 reimages the respective light rays 16a, 16a', 16b, 16b' onto the respective second optical subsystem 20a, 20b. The second optical subsystem 20a, 20b redirects the light rays to a final image so that the light rays are in registration. In particular, the light rays 26a, 26b from the second optical subsystem 20a, 20b are received by a refractive field lens 25 which refocuses the light rays 26a', 26b' onto a detector array. The collecting lens 15 and the field lens 25 are both shared between the subapertures.

Figure 4:
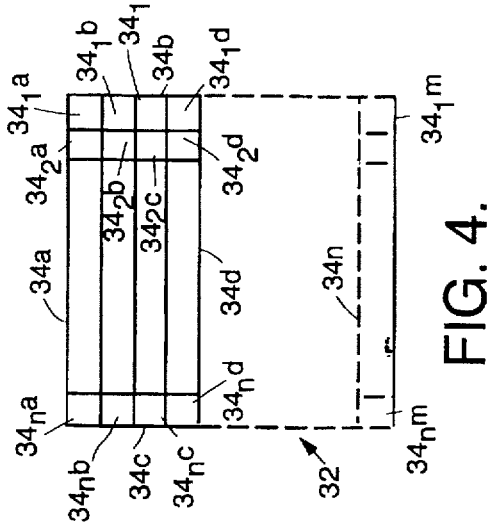
FIG. 4 is a schematic diagram of a line image 14 reformatted into an array.

FIG. 4 is schematic diagram of a line image 14 reformatted into an array. The array 32 is an n=m array of detector cells $34_1a, \ldots, 34_nm$. As illustrated, the first line image segment 14a is reformatted as a first row 34a of the detector cell array 32. Each light bundle $B_1a, \ldots, B_na$ is incident onto a respective detector cell $34_1a, \ldots, 34_na$ to create pixel data for processing by the data processor 2. Similarly, the second, third and fourth line image segments 14b, 14c, 14d are reformatted as second, third and fourth rows 34b, 34c, 34d of the array 32, respectively. For a 256 ×256 detector cell array 32, n=m=256 and 252 rows of the array 32 are unused.

FIGS. 5A–5C are enlarged schematic diagrams of the subapertures of FIG. 3A. For convenience, the components have been labelled to be consistent with the CODE V listing of Appendix A. In particular, surface x of the listing is labelled with reference character Sx in the figures. For ease of understanding, some of the symbols used will now be defined:

RDY: Radius of curvature;

THI: Thickness from one surface to the next surface;

GLA: Material filling the thickness (blank=air);

CCY, THC, GLC: Control parameters for optimization of radius of curvature, thickness and glass, respectively (0=full variation, 100=no variation).

Diffractive holographic optical elements (HOE) are the binary optic elements, which are described by phase coefficients (C1–C14). Each line image segment 14 is represented by CODE V as five field points (XOB, YOB), which are traced through the optical system 1.

FIG. 5A is a schematic diagram illustrating the image source 5 and first optical subsystem 10a of FIG. 3A. The object (OBJ) is a first surface of the first optical subsystem 10a and corresponds to the intermediate image. The object is illustrated at a second surface S2 of the first optical subsystem 10a. An aperture stop (STO) 5 corresponds to the exit pupil of the optical system that forms the intermediate image. The aperture stop 5 is reimaged by the first optical subsystem 10a and the collecting lens 15 onto the second optical subsystem 20a (FIG. 5B) of the subaperture.

The first optical subsystem 10a includes six surfaces (S2–S7). A first binary optic element S2 (second surface) is formed on a third surface S3 which is planar (i.e. infinite radius). The first binary optic S2 and the third surface S3 are formed on a first zinc sulfide prism 11a bounded by a fourth surface S4 and a fifth surface S5. An air gap separates the first prism 11a from a zinc sulfide lens 12 bounded by a sixth surface S6 and a seventh surface S7. The zinc sulfide lens 12 is shared between the subapertures.

FIG. 5B is a schematic diagram illustrating the collecting lens 15 and second optical subsystem 20a of FIG. 3A. The first optical subsystem 10a is separated from the collecting lens 15 by an air gap. The collecting lens 15 is fabricated from zinc sulfide and is bounded by an eighth surface S8 and a ninth surface S9. The collecting lens 15 is separated from the second optical subsystem 20a by an air gap. A tenth surface S10 and an eleventh surface S11 are dummy surfaces used to optimize the system in CODE V and form part of the air gap.

The second optical subsystem 20a includes four surfaces (S12–S15). A second zinc sulfide prism 21a is bounded by a twelfth surface S12 and a thirteenth surface S13. The image from the aperture stop 5 is reimaged at the thirteenth surface S13. A fourteenth surface S14 is overlayed on the thirteenth surface S13. The fourteenth surface S14 is a second binary optic element.

FIG. 5C is a schematic diagram illustrating the field lens 25 of FIG. 3A. The second optical subsystem 20a is separated from the field lens 25 by an air gap which is defined by the sum of thicknesses for a fifteenth surface S15, a sixteenth surface S16 and a seventeenth surface S17. The sixteenth surface S16 and the seventeenth surface S17 are dummy surfaces in CODE V. The field lens 25 is fabricated from silicon. The field lens 25 is bounded by a eighteenth surface S18 and a nineteenth surface S19.

The field lens 25 is separated from the image area (IMG) $I_f$ by an air gap. The detector array is located at the image area to receive the reformatted light from the optics.

The diffraction profile for the fourteenth surface S14 is preferably computed by the CODE V program. FIGS. 6A–6B, 7A–7B, and 8A–8B are profile contours generated by CODE V for the fourteenth surface S14 of the second optical subsystem 20a, 20b of FIGS. 3A and 3B, respectively. The profiles were all computed for a wavelength of 3,800 nm. The fourteenth surface S14 of the first subaperture has a minimum contour at −0.84 waves and a maximum contour at 1.61 waves. The fourteenth surface S14 of the second subaperture has a minimum contour at −0.44 waves and a maximum contour at 1.77 waves.

Figure 6A:
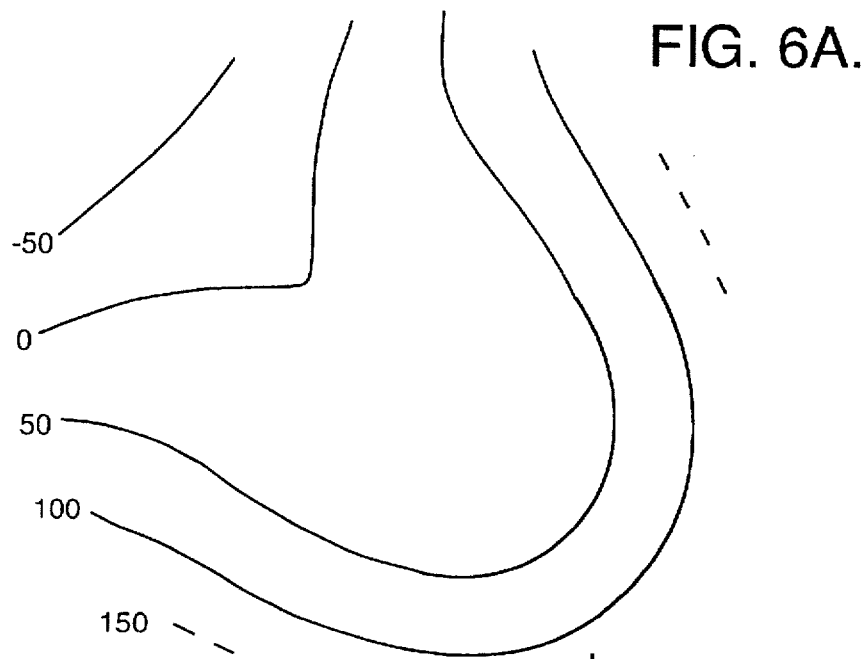
FIGS. 6A–6B are first level diffractive phase profile contours for the binary optic 20 of FIGS. 3A and 3B, respectively.
Figure 6B:
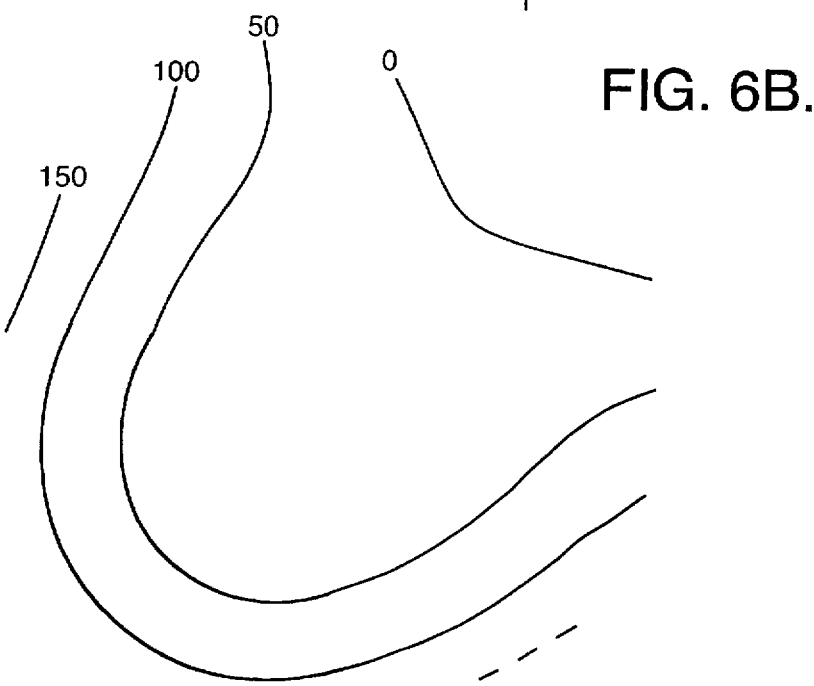

FIGS. 6A–6B are first level diffractive phase profile contours for the fourteenth surface S14 of FIGS. 3A and 3B, respectively. The contour interval is 0.50 waves.

Figure 7A:
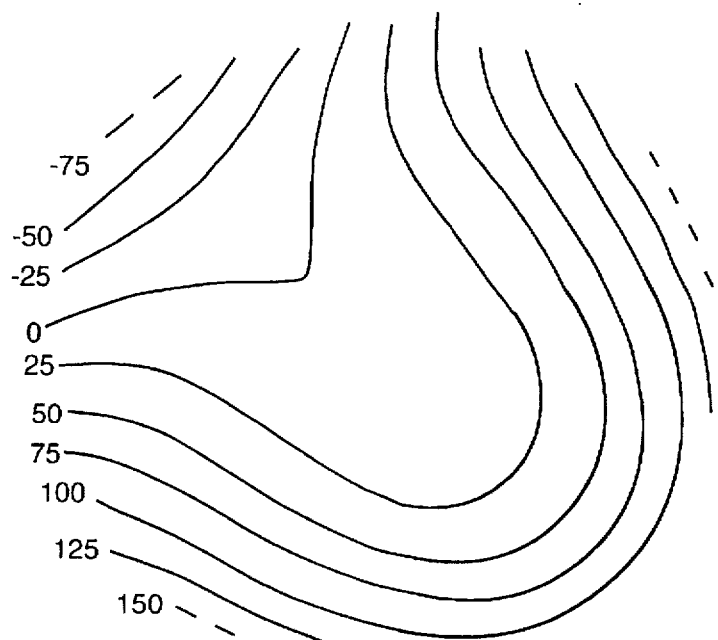
FIGS. 7A–7B are second level diffractive phase profile contours for the binary optic 20 of FIGS. 3A and 3B, respectively.
Figure 7B:
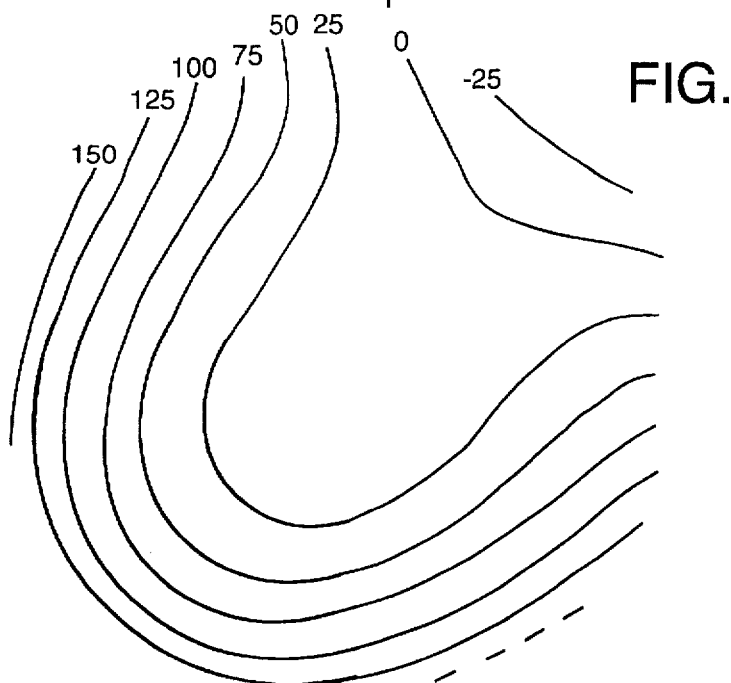

FIGS. 7A–7B are second level diffractive phase profile contours for the fourteenth surface S14 binary optic element of FIG. 3A and 3B, respectively. The contour interval is 0.25 waves.

Figure 8A:
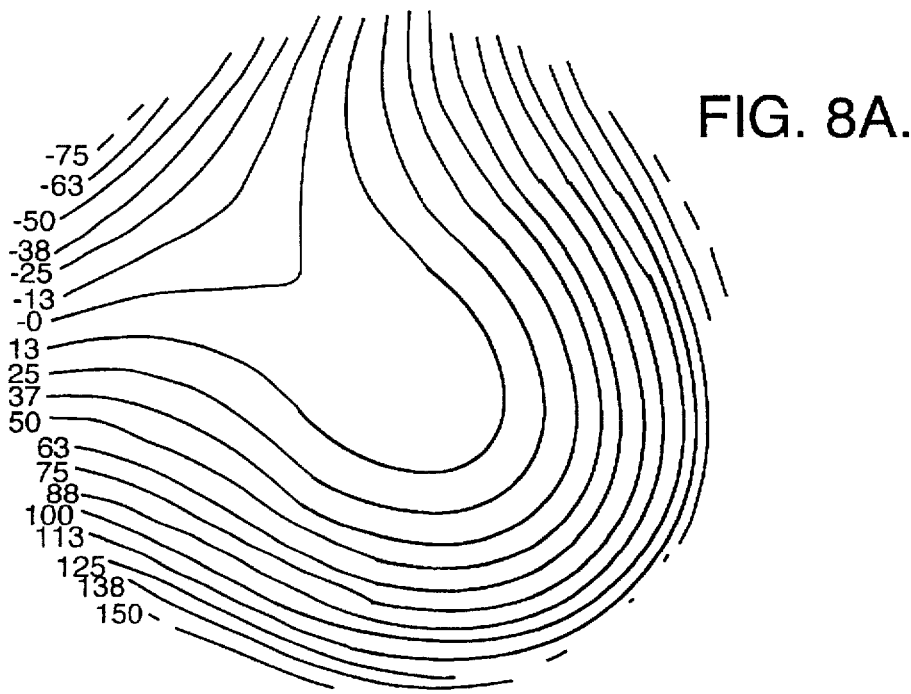
FIGS. 8A–8B are third level diffractive phase profile contours for the binary optic 20 of FIGS. 3A and 3B, respectively.
Figure 8B:
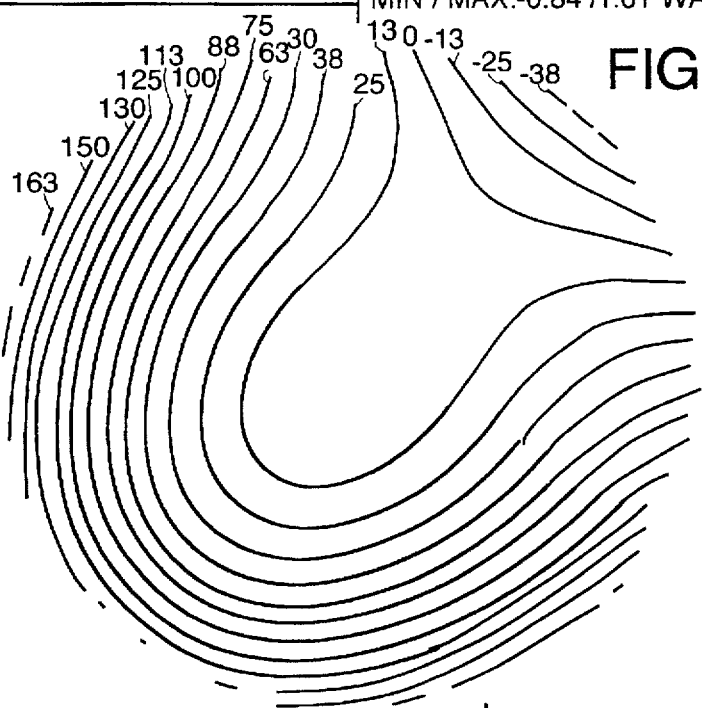

FIGS. 8A–8B are third level diffractive phase profile contours for the fourteenth surface S14 binary optic element of FIGS. 3A and 3B, respectively. The contour interval is 0.125 waves.

Figure 9A:
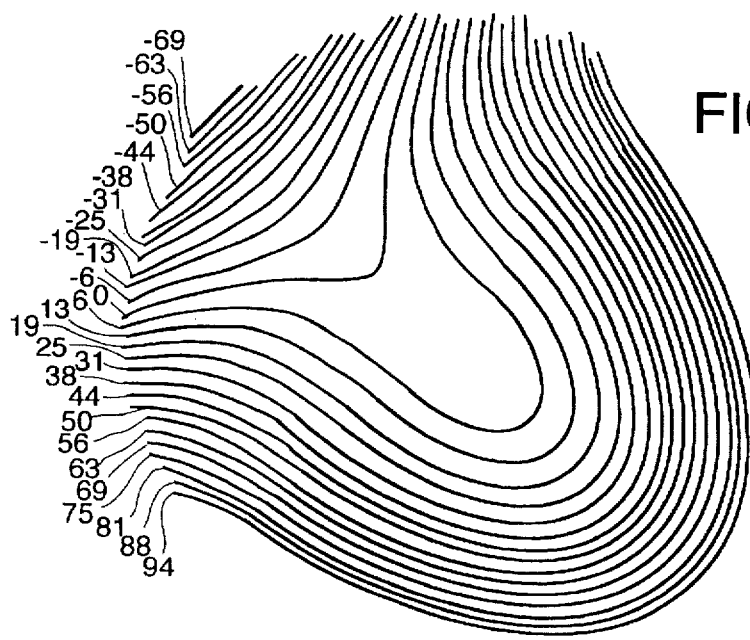
FIGS. 9A–9B are fourth level diffractive phase profile contours for the binary optic 20 of FIGS. 3A and 3B, respectively.
Figure 9B:
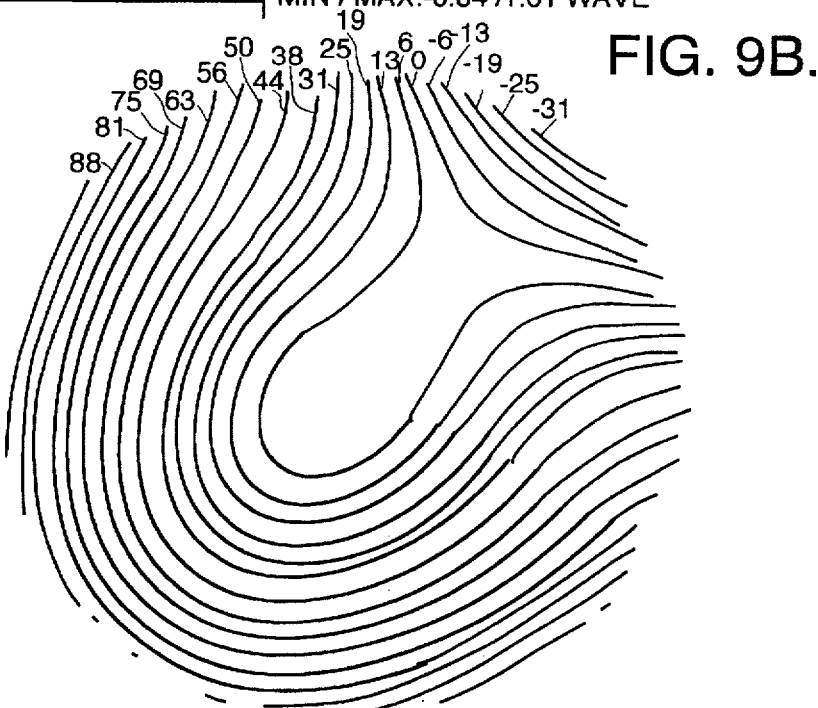

FIGS. 9A–9B are fourth level diffractive phase profile contours for the fourteenth surface S14 binary optic element of FIGS. 3A and 3B, respectively. The contour interval is 0.0625 waves. Because CODE V will only plot 30 contours, the remaining contours are not shown. However, CODE V does compute all contours.

From the multi-level diffractive phase profiles a multi-level diffractive surface is fabricated to form the binary optic component. The above described embodiment of the invention has a root-mean-square (RMS) wavefront error of about 1/28 wave. The maximum phase error for any of the field points is about 0.2 wave at 3,400, 3,800 and 4,200 nm.

From the above discussion, one of ordinary skill in the art can use a lens design tool to construct various image reformatters. For example, the optical system 1 can be modified to employ eight subapertures to reformat 2,000 pixels and twelve subapertures to reformat 6,000 pixels.

In addition, Time Delay and Integration (TDI) functions can be performed by using successive lines in the detector array. Using TDI, the signal-to-noise ratio of the detected image is increased over a single detected image. FIGS. 10A–10D and 11A–11D are schematic diagrams illustrating an intermediate image reformatted for TDI.

FIGS. 10A–11D are schematic diagrams of an intermediate line image at discrete times $t_0$, $t_1$, $t_2$, $t_3$, respectively. The intermediate image is formed by a plurality of line images 14. As illustrated, there are four line images 14A, . . . , 14D representing the line image. As the intermediate image is translated across the object, the line images 14A, . . . , 14D are scrolled so that, for example, the image represented at line image 14A at time to (FIG. 10A) scrolls to line images 14B (FIG. 10B), 14C (FIG. 10C) and 14D (FIG. 10D) at times $t_1$, $t_2$ and $t_3$, respectively. As previously discussed, the optical system 1 segments the line images 14 into the image segments. However, the segmentation now creates image blocks 140a, . . . , 140d having a respective segment from each of the line images 14A, . . . , 14D. Each image block 140a, . . . , 140d is reformatted by a respective subaperture.

FIGS. 11A–11D are schematic diagrams illustrating the time progression of the line images of FIGS. 10A–10D reformatted for TDI. Each line image 14A, . . . , 14D is reformatted by the optical system 1 onto a respective group of image cells 34A, . . . , 34D. Each image block 140a, . . . , 140d (FIGS. 10A–10D) is preferably reformatted by a respective subaperture to a respective superrow of image cells 340a, . . . , 340d on the detector 32. The data processor 2 can reconstruct a scan line of the image by reading the image cells 34A, . . . , 34D. The data processor reads the image data from image cell 34A at time to (FIG. 11A), from image cell 34B at time $t_1$, (FIG. 11B), from image cell 34C at time $t_2$ (FIG. 11C) and from image cell 34D at time $t_3$ (FIG. 1D). The image data read at times to, . . . , $t_3$ are then summed to yield an enhanced scan line for the image. The scan lines are then combined to create a complete image.

Figure 11A:
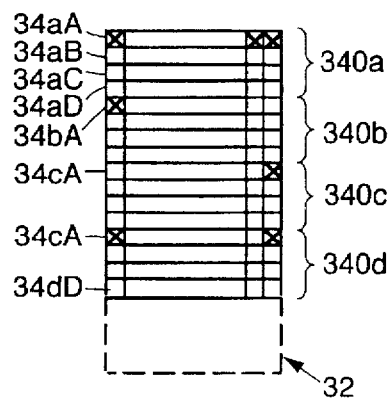
FIGS. 11A-11D are schematic diagrams of the line images of FIGS. 10A-10D reformatted for Time Delay and Integration.
Figure 11B:
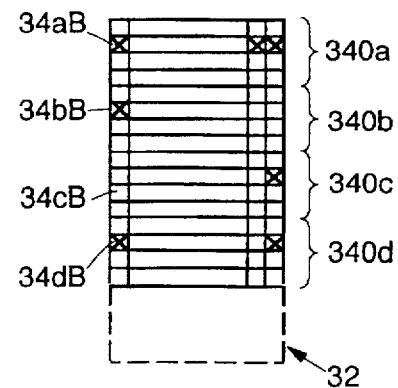
Figure 11C:
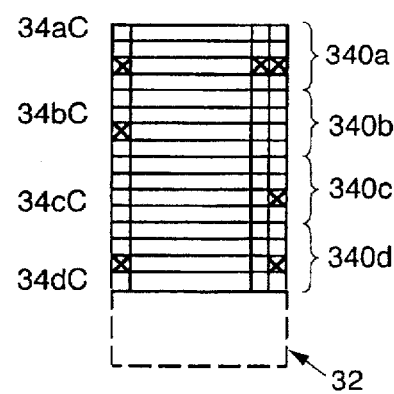
Figure 11D:
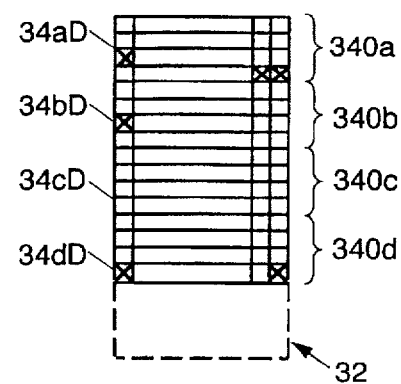

As illustrated, the intermediate image (activated pixels shown by x's) of line 14A of FIG. 10A is segmented and reformatted as illustrated in FIG. 11A. A first segment is reformatted to image cell 34aA, a second segment is imaged to image cell 34bA, a third segment is imaged to image cell 34cA and a fourth segment is imaged to image cell 34dA. At time $t_1$, the intermediate image is at line image 14B, where it is segmented and reformatted to image cells 34aB, 34bB, 34cB and 34dB (FIG. 11B). Relationship between FIGS. 10C–10D and FIGS. 11C–11D are similar to the above segmenting and reformatting as illustrated. After time $t_3$, the intermediate image has moved beyond the line image detectors.

The dispersive nature of diffractive optics can be further exploited to realize an imaging spectrometer. The dispersion inherent in diffractive optics can be used to produce a dispersed image of the line image 14 on the detector array 32. Successive lines in the detector array 32 correspond to different wavelengths of light from the line image. In other words, a single segment of the line image 14 is mapped onto several successive lines in the detector array 32, where each of these lines detects light of a different wavelength.

Figure 12:
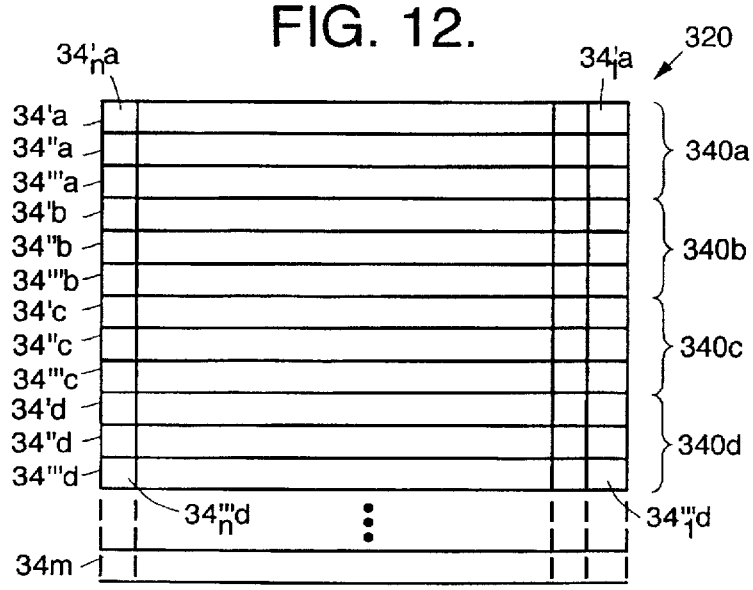
FIG. 12 is a schematic diagram of a line image 14 reformatted into a spectral array.

FIG. 12 is a schematic diagram of a line image 14 reformatted into a spectral array 320. Each image cell 34 of the array 32 represents a spectral range centered about a predetermined wavelength of light. The image cells 34 are grouped together to form superrows 340. Each superrow 340 includes an image cell 34 for each spectral range. Each superrow 340 corresponds to a respective line image segment 14 such that the light bundles B from the line image segment 14 are dispersed between the image cells 34 in the superrow 340 based on the wavelengths of light from the light bundles B. Each segment of the line image 14a, . . . , 14d is spectrally mapped to the array 32 by the diffractive optic elements. Preferably, the spectral ranges represent red, green and blue light. Thus, each superrow 340 includes three image cells 34, one cell for each color. Other spectral ranges can be employed instead of or in addition to red, green and blue. In particular, the dispersion can be based on predetermined wavelengths of infrared light. For clarity of description, each superrow 340 is illustrated as encompassing only three image cells 34 of the detector array 32.

More particularly, the detector array 32 is logically divided into four superrows 340a, . . . , 340d, one for each line image segment 14a, . . . , 14d. Each superrow 340a, . . . , 340d encompasses a first image cell 34', a second image cell 34" and a third image cell 34'". For each line image segment 14, the binary optics directs light of a first wavelength Xλ' to the first image cell 34', a second wavelength λ" to the second image 34"and a third wavelength λ'" to the third image cell 34'". For example, spectral components of the light from light bundle $B_1a$ of line image segment 14a is directed to detector cells $34_1a$, $34_1"a$ and $34_1'"a$ of superrow 340a. The intensity of the incident light components on the respective detector cells $34_1'a$, $34_1"a$ and $34_1'"a$ is proportional to the contribution of those light components to the light of the light bundle $B_1a$. The light from the remaining light bundles B are reformatted in a similar way to be incident on respective detector cells.

Preferred embodiments of the invention may also employ detector systems other than two-dimensional detector arrays. In particular, image cells can be disjointed and positioned anywhere in three-dimensional space. As such, individual image cells can be used and selectively positioned to simplify the optics of the optical system 1.

Although the optical image reformatter specified in Appendix A and illustrated in FIGS. 3A and 3B can adequately reformat a line image onto an array of detector cells, the device can be improved by reducing the number of prisms in the system. For example, the prisms 11a, 11b of the first optical subsystem 10a, 10b may cause pixel loss in the system. This is because the clear apertures of the prisms 11a, 11b cannot be extended to the edges of the prisms and because the two prisms cannot be put close enough together to capture all of the pixels from the object. There may also be vignetting of the light exiting the prisms.

Furthermore, there are a plurality of exit pupils for the system, one exit pupil for each subaperture. If the optical image reformatter is used to reformat infrared radiation, a cold stop is needed to eliminate thermal emissions from the inside surfaces of the reformatter and from the inside of an objective lens of the image source 3 (FIG. 1), thereby increasing the signal-to-noise ratio of the system. However, when there are multiple exit pupils, there must be a cold stop at each exit pupil. Although each cold stop would be effective for the respective subaperture, stray emissions from the other subapertures can impinge on the cold stop and degrade performance.

Figure 13A:
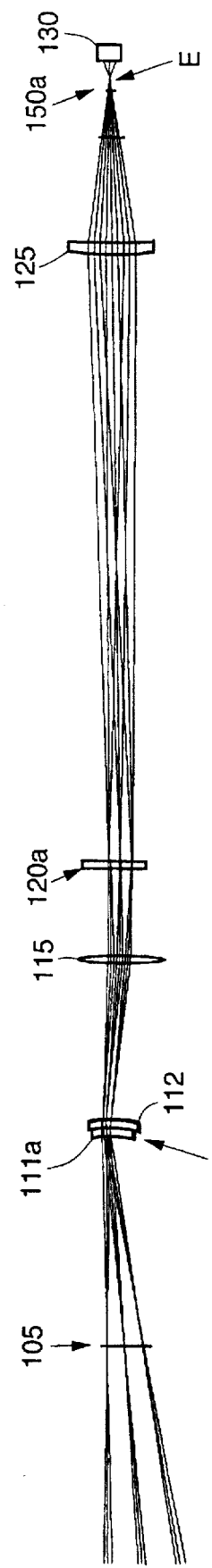
FIGS. 13A-13B are schematic diagrams of the optical components of two subapertures of another optical image reformatter in accordance with the invention.
Figure 13B:
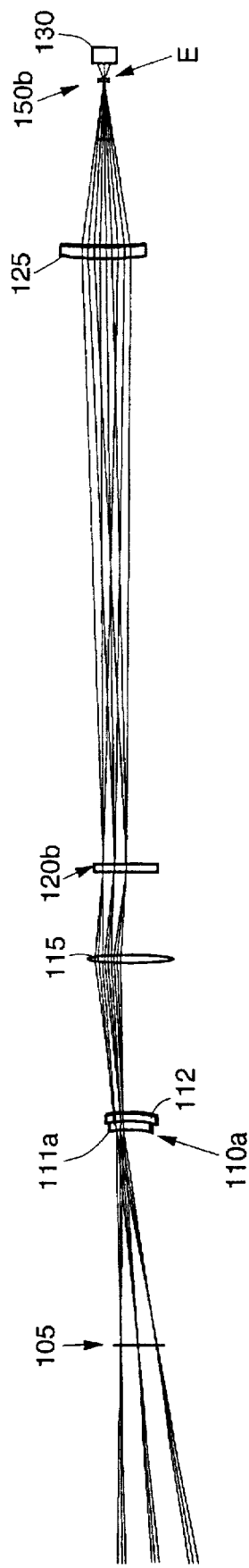

A listing from CODE V for another preferred embodiment of an optical image reformatter in accordance with the invention is provided in Appendix B to this application. FIGS. 13A–13B are schematic diagrams of the optical components of two subapertures as generated by CODE V in accordance with Appendix B. FIG. 13A illustrates a first subaperture and FIG. 13B illustrates a second subaperture of the system. As discussed above, the other half of the system is identical to the illustrated half by virtue of the symmetry of the system. The optical image reformatter specified by Appendix B has an RMS wavefront error of about 1/33 wave.

As described above, the optical image reformatter segments and reformats a line image at the exit pupil of an objective lens 105 onto an image array. Each subaperture includes a respective first optical subsystem 110a, 110b, a respective second optical subsystem 120a, 120b, and a respective optical combiner 150a, 150b. As above, the elements of the first optical subsystems 110a, 110b segment the line image into image segments. Light rays exiting the first optical subsystems 110a, 110b are focused by a shared field lens 115 onto the second optical subsystem 120a, 120b for the subaperture.

As above, the elements of the second optical subsystems 120a, 120b reimage the line segments toward respective cells of a detector array. Light exiting the second optical subsystem 120a, 120b is focused by a shared field lens 125 onto the optical combiner 150a, 150b. The optical combiners 150a, 150b combine the images of each subaperture onto a common shared exit pupil E.

FIGS. 14A–14B are enlarged schematic diagrams of the first optical subsystem 1101a, 110b, collecting lens 115 and second optical subsystem 120a, 120b of FIGS. 13A–13B, respectively. For convenience, the component surfaces have been labelled to be consistent with the CODE V listing of Appendix B. In particular, surface x of the listing is labelled with reference character Sx' in the figures.

The first optical subsystem 110a, 110b includes two optical elements defined by surfaces S4'–S7' and S8'S9', respectively. A first diffractive optic element S4' is formed on a fifth surface S5' which is planar. The first diffractive optic element S4' and the fifth surface S5' are formed on a first zinc sulfide substrate 111a, 111b bounded by a sixth surface S6' and a seventh surface S7'. Note that the first substrate 111a, 111b is not a prism. An air gap separates the first substrate 111a, 111b from a zinc sulfide lens 112 bounded by an eighth surface S8' and a ninth surface S9'. The zinc sulfide lens 112 is shared between the subapertures.

Diffractive optic elements 111a, 111b are used in place of prisms so as to eliminate pixel loss. That is because the gaps between the grading elements are limited only by the fabrication technique of the binary optic, which only needs to be less than the pixel spacings. The collecting lens 115 is fabricated from zinc sulfide and is bounded by a tenth surface S10' and an eleventh surface S11'. An air gap separates the collecting lens 115 from the first optical subsystems 110a, 110b and the second optical subsystems 120a, 120b.

The second optical subsystem 120a, 120b includes two optical elements defined by surfaces S12'–S13' and S13'–S16', respectively. The first element 121a, 121b is bounded by surfaces S12' and S13'and is fabricated from zinc sulfide. The second element 122a, 122b incudes a diffractive optic element at surface S15'.

FIGS. 15A–15B are enlarged schematic diagrams of the field lens 125 and the optical combiners 150a, 150b of FIGS. 13A–13B, respectively. The field lens 125 is separated from the second optical subsystems 120a, 120b by an air gap. The field lens 125 is fabricated from silicon and is bounded by surfaces S17' and S18'. An air gap separates the field lens 125 from the optical combiners 150a, 150b.

The optical combiners 150a, 150b include three optical elements: a diffractive optic element 152a, 152b, a first combining lens 154 and a second combining lens 156. In the optical image reformatter specified in Appendix B, both combining lenses 154, 156 are shared by all subapertures. The optical combiners 150a, 150b combine the images of the separate subapertures onto a single shared exit pupil E at surface S27'. The light bundles exit the exit pupil E and impinge on detector cells in the detector array 130 (FIGS. 13A–13B).

In the optical combiners 150a, 150b, the diffractive optics 152a, 152b is surface S19' fabricated on surface S21'of a zinc sulfide substrate, which is bounded by surfaces S21' and S22'. The first combining lens 154 is fabricated from silicon and is bounded by surfaces S23' and S24'. The second combining lens 156 is fabricated from zinc sulfide and is bounded by surfaces S25' and S26'.

In a preferred embodiment of the invention, a single cold stop 158 is placed at the exit pupil E between the optics and the detector array 130 in an infrared detecting system. The cold stop is optimized to reduce thermal emissions from the optics, thereby increasing the signal-to-noise ratio of the system.

The use of binary optics instead of prisms to segment and reimage the line image results in additional wavelength dispersion. As with the embodiment specified in Appendix A, the dispersion is corrected by the other binary optics and by the off-axial lens elements in the optical image reformatter. Other suitable techniques may also be employed without deviating from the scope of the invention.

Equivalents

Those skilled in the art will know, or be able to ascertain using no more than routine experimentation, many equivalents to the specific embodiments of the invention described herein. For example, the CODE V listing in Appendix A can be run without defining the dummy surfaces S10, S11, S16, S17. These and all other equivalents are intended to be encompassed by the following claims.

-24-

Appendix A

```
            RDY              THI    RMD      GLA            CCY   THC   GLC
OBJ:       INFINITY        -4.440000                        100   100
STO:       INFINITY         4.440000                        100   100
  2:       INFINITY         0.000000                        100   100
   HOE:
   HV1:  REA            HV2:  VIR            HOR:     1
   HX1:0.000000E+00     HY1:0.000000E+00     HZ1:-.100000E+11
   CX1:     100         CY1:     100         CZ1:    100
   HX2:0.000000E+00     HY2:0.000000E+00     HZ2:0.100000E+11
   CX2:     100         CY2:     100         CZ2:    100
   HWL:  3800.00        HTO:  SPH            HNO:     65
   HCO/HCC
   C1 : -1.1685E-03     C2 :  4.3735E-04
   C1 :      0          C2 :      0
   XDE:    0.000000     YDE:    0.000000     ZDE:    0.000000
   XDC:      100        YDC:      100        ZDC:      100
   ADE:    0.000000     BDE:    0.000000     CDE:    0.000000
   ADC:      100        BDC:      100        CDC:      100

3:       INFINITY         0.000000                        100   100
  4:       INFINITY         0.100000      ZNS_SPECIAL       100    0
  5:       INFINITY         0.005000      AIR               100    0
   XDE:    0.000000     YDE:    0.000000     ZDE:    0.000000   DAR
   XDC:      100        YDC:      100        ZDC:      100
   ADE:   -3.218855     BDE:   -3.221953     CDE:    0.000000
   ADC:      0          BDC:      0          CDC:      100

6:         9.92706        0.150000      ZNS_SPECIAL         0    0
  7:        -4.25506        2.443948                          0    0
  8:         3.27792        0.400000      ZNS_SPECIAL         0    0
  9:       -11.76826        0.601388                          0    0
 10:         1.81595        0.242018      AIR               100   100
 11:         2.30411        0.091329                        100   100
 12:       INFINITY         0.107423      ZNS_SPECIAL       100   100
   XDE:    0.000000     YDE:    0.000000     ZDE:    0.000000   DAR
   XDC:      100        YDC:      100        ZDC:      100
   ADE:    0.224242     BDE:   -1.800019     CDE:    0.000000
   ADC:      0          BDC:      0          CDC:      100

13:       INFINITY         0.000000                        100   100
   XDE:   -0.160000     YDE:    0.160000     ZDE:    0.000000   DAR
   XDC:      100        YDC:      100        ZDC:      100
   ADE:    0.000000     BDE:    0.000000     CDE:    0.000000
   ADC:      100        BDC:      100        CDC:      100

14:       INFINITY         0.000000                        100   100
   HOE:
   HV1:  REA            HV2:  VIR            HOR:     1
   HX1:0.000000E+00     HY1:0.000000E+00     HZ1:-.100000E+11
   CX1:     100         CY1:     100         CZ1:    100
   HX2:0.000000E+00     HY2:0.000000E+00     HZ2:0.100000E+11
   CX2:     100         CY2:     100         CZ2:    100
   HWL:  3800.00        HTO:  SPH            HNO:     65
   HCO/HCC
   C1 : -3.7768E-03     C2 :  1.4599E-04     C3 : -8.7281E-03
   C1 :      0          C2 :      0          C3 :      0
   C4 : -3.7833E-03     C5 : -9.5317E-03     C6 :  2.0512E-02
   C4 :      0          C5 :      0          C6 :      0
```

```
         C7 :   -7.5457E-03     C8 :   2.9433E-02    C9 :  -4.9667E-03
         C7 :          0        C8 :          0     C9 :          0
         C10:    4.0489E-02    C11:  -6.5654E-03    C12:   9.2560E-02    :
         C10:          0        C11:          0     C12:          0
         C13:   -8.8405E-03    C14:   4.6452E-02
         C13:          0        C14:          0
         XDE:    0.116048       YDE:    0.015490    ZDE:    0.000000    DAR
         XDC:          0        YDC:          0     ZDC:    100
         ADE:    0.000000       BDE:    0.000000    CDE:    0.000000
         ADC:    100            BDC:    100         CDC:    100

15:      INFINITY       2.752362                                100       0
    16:       1.52293       0.000000        AIR                     100     100
    17:       1.26675       0.037508                                100     100
    18:       6.62896       0.400000        SILICON_SPECIAL           0       0
    19:      20.99948       1.936580                                  0       0
   IMG:      INFINITY       0.000000                                100     100

SPECIFICATION DATA
    NAO        0.08333
    DIM           IN
    WL       4200.00       3800.00       3400.00
    REF           2
    WTW           1             1             1
    XOB       0.00000       0.08333       0.16667       0.04882       0.11785
    YOB       0.00000       0.00000       0.00000       0.00000       0.00000
    VUX       0.14514       0.14759       0.15287       0.14635       0.14931
    VLX       0.13996       0.14144       0.13938       0.14113       0.14115
    VUY       0.13948       0.14056       0.14117       0.14017       0.14087
    VLY       0.14525       0.14332       0.14167       0.14408       0.14260

APERTURE DATA/EDGE DEFINITIONS
   CA APE
   CIR  S8           0.600000
   CIR  S9           0.600000
   CIR  S10          0.450000
   CIR  S11          0.450000
   CIR  S12          0.500000
   CIR  S13          0.160000
   CIR  S16          0.600000
   CIR  S17          0.600000
   CIR  S18          0.700000
   CIR  S19          0.700000

REFRACTIVE INDICES
    GLASS CODE           4200.00       3800.00       3400.00
    ZNS_SPECIAL          2.250697      2.252856      2.254988
    SILICON_SPECIAL      3.424589      3.426359      3.428812

No solves defined in system

ZOOM DATA
                      POS 1         POS 2

YOB F1        0.00000       0.00000
    YOB F2        0.00000       0.00000
    YOB F3        0.00000       0.00000
    YOB F4        0.00000       0.00000
    YOB F5        0.00000       0.00000
    XOB F1        0.00000       0.16667
```

-26-

```
XOB  F2            0.08333        0.25000
XOB  F3            0.16667        0.33333
XOB  F4            0.04882        0.21548
XOB  F5            0.11785        0.28452
VUY  F1            0.13948        0.14528
VLY  F1            0.14525        0.14323
VUY  F2            0.14056        0.14286
VLY  F2            0.14332        0.14591
VUY  F3            0.14117        0.13999
VLY  F3            0.14167        0.14885
VUY  F4            0.14017        0.14392
VLY  F4            0.14408        0.14477
VUY  F5            0.14087        0.14173
VLY  F5            0.14260        0.14709
VUX  F1            0.14514        0.15099
VLX  F1            0.13996        0.14357
VUX  F2            0.14759        0.15159
VLX  F2            0.14144        0.14170
VUX  F3            0.15287        0.15719
VLX  F3            0.13938        0.13384
VUX  F4            0.14635        0.15086
VLX  F4            0.14113        0.14306
VUX  F5            0.14931        0.15319
VLX  F5            0.14115        0.13931
RSL                    DEF            DEF
XDE  S13           -0.16000        0.16000
XDC  S13              100            100
YDE  S13            0.16000        0.16000
YDC  S13              100            100
HCO  S14  C1     -0.3227E-02    -0.3507E-02
HCC  S14  C1            0              0
HCO  S14  C2      0.1460E-03     0.3584E-02
HCC  S14  C2            0              0
HCO  S14  C3     -0.8728E-02    -0.3915E-02
HCC  S14  C3            0              0
HCO  S14  C4     -0.3783E-02     0.1496E-02
HCC  S14  C4            0              0
HCO  S14  C5     -0.9532E-02    -0.9987E-02
HCC  S14  C5            0              0
HCO  S14  C6      0.2051E-01     0.2847E-01
HCC  S14  C6            0              0
HCO  S14  C7     -0.7546E-02     0.7205E-02
HCC  S14  C7            0              0
HCO  S14  C8      0.2943E-01     0.7897E-02
HCC  S14  C8            0              0
HCO  S14  C9      0.4967E-02    -0.9985E-02
HCC  S14  C9            0              0
HCO  S14  C10     0.4049E-01     0.3402E-01
HCC  S14  C10           0              0
HCO  S14  C11    -0.6565E-02     0.2849E-01
HCC  S14  C11           0              0
HCO  S14  C12     0.9256E-01     0.5069E-01
HCC  S14  C12           0              0
HCO  S14  C13     0.8840E-02     0.3257E-01
HCC  S14  C13           0              0
HCO  S14  C14     0.4645E-01     0.3708E-01
HCC  S14  C14           0              0
ADE  S12            0.22424        0.87281
ADC  S12              0              0
BDE  S12           -1.80002        4.88417
```

-27-

```
BDC S12                         0           0
XDE S14                   0.11605     0.26058
XDC S14                         0           0
YDE S14                   0.01549    -0.09264
YDC S14                         0           0
HCO S2    C1        -0.1169E-02 -0.1712E-02
HCC S2    C1                    0           0
HCO S2    C2         0.4374E-03  0.4784E-03
HCC S2    C2                    0           0
HCO S2    C3            0.00000     0.00000
HCC S2    C3                100         100
HCO S2    C4            0.00000     0.00000
HCC S2    C4                100         100
HCO S2    C5            0.00000     0.00000
HCC S2    C5                100         100
HCO S2    C6            0.00000     0.00000
HCC S2    C6                100         100
HCO S2    C7            0.00000     0.00000
HCC S2    C7                100         100
HCO S2    C8            0.00000     0.00000
HCC S2    C8                100         100
HCO S2    C9            0.00000     0.00000
HCC S2    C9                100         100
HCO S2    C10           0.00000     0.00000
HCC S2    C10               100         100
HCO S2    C11           0.00000     0.00000
HCC S2    C11               100         100
HCO S2    C12           0.00000     0.00000
HCC S2    C12               100         100
HCO S2    C13           0.00000     0.00000
HCC S2    C13               100         100
HCO S2    C14           0.00000     0.00000
HCC S2    C14               100         100
ADE S5                    -3.21886   -3.16747
ADC S5                          0           0
BDE S5                    -3.22195    3.14802
BDC S5                          0           0
XDE S2                    0.00000     0.00000
XDC S2                        100         100
YDE S2                    0.00000     0.00000
YDC S2                        100         100
```

This is a decentered system. If elements with power are decentered or tilted, the first order properties are probably inadequate in describing the system characteristics.

```
                    POS 1        POS 2
INFINITE CONJUGATES
    EFL       -108.1765    -106.6247
    BFL        167.3438     164.8105
    FFL        -66.3511     -65.4006
    FNO       -145.6766    -143.5869
AT USED CONJUGATES
    RED          1.5281       1.5267
    FNO         -9.1687      -9.1602
    OBJ DIS     -4.4400      -4.4400
    TT           9.2676       9.2676
    IMG DIS      1.9366       1.9366
    OAL         11.7710      11.7710
    PARAXIAL IMAGE
```

-28-

```
HT              0.0000    0.0000
THI             2.0385    2.0279
ANG             0.0000    0.0000
ENTRANCE PUPIL
  DIA           0.7426    0.7426
  THI           0.0000    0.0000
EXIT PUPIL
  DIA           1.2107    1.2107
  THI          -9.0232   -9.0232
STO DIA         0.6390    0.6362
```

-29-

Appendix B

```
            RDY              THI        RMD      GLA              CCY    THC    GLC
OBJ:        INFINITY        -8.880000                             100    100
  1:        INFINITY         0.000000         ZNS_SPECIAL         100    100
  2:        INFINITY         0.000000                             100    100
STO:        INFINITY         8.880000                             100    100
  4:        INFINITY         0.000000                             100    100
    HOE:
    HV1:   REA              HV2:  VIR              HOR:     1
    HX1:0.000000E+00        HY1:0.000000E+00       HZ1:-.200000E+11
    CX1:    100             CY1:    100            CZ1:    100
    HX2:0.000000E+00        HY2:0.000000E+00       HZ2:0.200000E+11
    CX2:    100             CY2:    100            CZ2:    100
    HWL:  3800.00           HTO:  SPH              HNO:    65
    HCO/HCC
    C1 :  -6.4740E-02       C2 :  6.1793E-02
    C1 :    100             C2 :    100

5:        INFINITY         0.000000                             100    100
  6:        INFINITY         0.150000         ZNS_SPECIAL         100    100
  7:        INFINITY         0.179162         AIR                 100    100
  8:        -3.57517         0.300000         ZNS_SPECIAL         100    100
  9:        -2.53966         5.495341                             100    100
 10:        10.88627         0.226129         ZNS_SPECIAL         100    100
 11:       -18.81874         3.091262                             100    100
 12:        INFINITY         0.214847         ZNS_SPECIAL         100    100
    XDE:    0.000000         YDE:   0.000000        ZDE:    0.000000    DAR
    XDC:    100              YDC:     100           ZDC:    100
    ADE:    0.265535         BDE:  -1.506175        CDE:    0.000000
    ADC:    100              BDC:     100           CDC:    100

13:        INFINITY         0.100000         ZNS_SPECIAL         100    100
 14:        INFINITY         0.000000                             100    100
    XDE:   -0.320000         YDE:   0.320000        ZDE:    0.000000    DAR
    XDC:    100              YDC:     100           ZDC:    100
    ADE:    0.000000         BDE:   0.000000        CDE:    0.000000
    ADC:    100              BDC:     100           CDC:    100

15:        INFINITY         0.000000                             100    100
    HOE:
    HV1:   REA              HV2:  VIR              HOR:     1
    HX1:0.000000E+00        HY1:0.000000E+00       HZ1:-.200000E+11
    CX1:    100             CY1:    100            CZ1:    100
    HX2:0.000000E+00        HY2:0.000000E+00       HZ2:0.200000E+11
    CX2:    100             CY2:    100            CZ2:    100
    HWL:  3800.00           HTO:  SPH              HNO:    65
    HCO/HCC
    C1 :  -1.7476E-03       C2 :  7.2023E-05      C3 :  1.1652E-03
    C1 :    100             C2 :    100           C3 :    100
    C4 :  -1.9328E-03       C5 : -1.7904E-03      C6 :  5.1999E-03
    C4 :    100             C5 :    100           C6 :    100
    C7 :  -1.3408E-03       C8 :  5.0670E-03      C9 : -9.7725E-04
    C7 :    100             C8 :    100           C9 :    100
    C10:   2.2585E-03       C11: -1.4456E-05      C12:  4.5264E-03
    C10:    100             C11:    100           C12:    100
    C13:   2.0932E-04       C14:  2.2232E-03
    C13:    100             C14:    100
```

-30-

```
        XDE:   0.490706    YDE:  -0.042650    ZDE:   0.000000    DAR
        XDC:      100      YDC:      100      ZDC:      100
        ADE:   0.000000    BDE:   0.000000    CDE:   0.000000
        ADC:      100      BDC:      100      CDC:      100

16:       INFINITY          21.701651                              100   100
 17:        4.71973           0.300000       SILICON_SPECIAL        100   100
 18:        7.35543           3.936806                              100   100
 19:       INFINITY           0.000000                              100   100
    HOB:
    HV1: REA            HV2: VIR              HOR:    1
    HX1:0.000000E+00    HY1:0.000000E+00      HZ1:-.200000E+11
    CX1:     100        CY1:     100          CZ1:    100
    HX2:0.000000E+00    HY2:0.000000E+00      HZ2:0.200000E-11
    CX2:     100        CY2:     100          CZ2:    100
    HWL:  3800.00       HTO: SPH              HNO:    65
    HCO/HCC
    C1 : -4.0633E-02    C2 :  4.0848E-02
    C1 :     100        C2 :     100

20:       INFINITY           0.000000                              100   100
 21:       INFINITY           0.050000       ZNS_SPECIAL            100   100
 22:       INFINITY           1.001448                              100   100
 23:        1.36501           0.130000       SILICON_SPECIAL        100   100
 24:        2.55865           0.270081                              100   100
 25:        0.24377           0.104026       ZNS_SPECIAL            100   100
 26:        0.24158           0.095062                              100   100
 27:       INFINITY           0.766602                              100   100
IMG:       INFINITY          -0.118997                              100   100

SPECIFICATION DATA
   NAO    0.08333
   DIM         IN
   WL     4200.00       3800.00        3400.00
   REF         2
   WTW         1              1              1
   INI       gwg
   XOB    0.00000       0.16667        0.33333
   YOB    0.00000       0.00000        0.00000
   VUX    0.14514       0.14759        0.15287
   VLX    0.13996       0.14144        0.13938
   VUY    0.13948       0.14056        0.14117
   VLY    0.14525       0.14332        0.14167

APERTURE DATA/EDGE DEFINITIONS
   CA APE
   CIR S10             1.200000
   CIR S11             1.200000
   CIR S12             1.000000
   CIR S14             0.320000
   CIR S17             1.400000
   CIR S18             1.400000

REFRACTIVE INDICES
   GLASS CODE          4200.00        3800.00        3400.00
   ZNS_SPECIAL         2.250697       2.252856       2.254988
   SILICON_SPECIAL     3.424589       3.426359       3.428812
```

-31-

No solves defined in system

ZOOM DATA

|  |  |  | POS 1 | POS 2 |
|---|---|---|---|---|
| YOB | F1 |  | 0.00000 | 0.00000 |
| YOB | F2 |  | 0.00000 | 0.00000 |
| YOB | F3 |  | 0.00000 | 0.00000 |
| XOB | F1 |  | 0.00000 | 0.33333 |
| XOB | F2 |  | 0.16667 | 0.50000 |
| XOB | F3 |  | 0.33333 | 0.66666 |
| VUY | F1 |  | 0.13948 | 0.14528 |
| VLY | F1 |  | 0.14525 | 0.14323 |
| VUY | F2 |  | 0.14056 | 0.14286 |
| VLY | F2 |  | 0.14332 | 0.14591 |
| VUY | F3 |  | 0.14117 | 0.13999 |
| VLY | F3 |  | 0.14167 | 0.14885 |
| VUX | F1 |  | 0.14514 | 0.15099 |
| VLX | F1 |  | 0.13996 | 0.14357 |
| VUX | F2 |  | 0.14759 | 0.15159 |
| VLX | F2 |  | 0.14144 | 0.14170 |
| VUX | F3 |  | 0.15287 | 0.15719 |
| VLX | F3 |  | 0.13938 | 0.13384 |
| RSL |  |  | DEF | DEF |
| XDE | S14 |  | -0.32000 | 0.32000 |
| XDC | S14 |  | 100 | 100 |
| YDE | S14 |  | 0.32000 | 0.32000 |
| YDC | S14 |  | 100 | 100 |
| HCC | S15 | C1 | -0.1748E-02 | -0.1888E-02 |
| HCC | S15 | C1 | 100 | 100 |
| HCO | S15 | C2 | 0.7202E-04 | 0.6539E-03 |
| HCC | S15 | C2 | 100 | 100 |
| HCO | S15 | C3 | 0.1165E-02 | -0.4404E-04 |
| HCC | S15 | C3 | 100 | 100 |
| HCO | S15 | C4 | -0.1933E-02 | -0.1213E-02 |
| HCC | S15 | C4 | 100 | 100 |
| HCO | S15 | C5 | -0.1790E-02 | -0.1625E-02 |
| HCC | S15 | C5 | 100 | 100 |
| HCO | S15 | C6 | 0.5200E-02 | 0.4538E-02 |
| HCC | S15 | C6 | 100 | 100 |
| HCO | S15 | C7 | -0.1341E-02 | -0.1678E-02 |
| HCC | S15 | C7 | 100 | 100 |
| HCO | S15 | C8 | 0.5067E-02 | 0.4604E-02 |
| HCC | S15 | C8 | 100 | 100 |
| HCO | S15 | C9 | -0.9772E-03 | -0.1577E-02 |
| HCC | S15 | C9 | 100 | 100 |
| HCO | S15 | C10 | 0.2259E-02 | 0.2257E-02 |
| HCC | S15 | C10 | 100 | 100 |
| HCO | S15 | C11 | -0.1446E-04 | -0.5430E-03 |
| HCC | S15 | C11 | 100 | 100 |
| HCO | S15 | C12 | 0.4526E-02 | 0.4115E-02 |
| HCC | S15 | C12 | 100 | 100 |
| HCO | S15 | C13 | 0.2093E-03 | -0.4757E-03 |
| HCC | S15 | C13 | 100 | 100 |
| HCO | S15 | C14 | 0.2223E-02 | 0.2220E-02 |
| HCC | S15 | C14 | 100 | 100 |
| ADE | S12 |  | 0.26553 | 0.94867 |
| ADC | S12 |  | 100 | 100 |

-32-

```
    BDE  S12                   -1.50617    -4.34743
    BDC  S12                       100         100
    XDE  S15                    0.49071     0.58304
    XDC  S15                       100         100
    YDE  S15                   -0.04265    -0.07413
    YDC  S15                       100         100
    HCO  S4    C1            -0.6474E-01  0.5350E-01
    HCC  S4    C1                  100         100
    HCO  S4    C2             0.6179E-01  0.6079E-01
    HCC  S4    C2                  100         100
    HCO  S19   C1            -0.4063E-01  0.4221E-01
    HCC  S19   C1                  100         100
    HCO  S19   C2             0.4085E-01  0.4149E-01
    HCC  S19   C2                  100         100
```

This is a decentered system. If elements with power are decentered or tilted, the first order properties are probably inadequate in describing the system characteristics.

```
                  POS 1      POS 2
INFINITE CONJUGATES
      EFL       -0.4468    -0.4464
      BFL       -0.0087    -0.0086
      FFL        9.0759     9.0670
      FNO       -0.3009    -0.3006
AT USED CONJUGATES
      RED       -2.2808    -2.3873
      FNO       13.6849    14.3241
      OBJ DIS   -8.8800    -8.8800
      TT        37.9934    37.9934
      IMG DIS    0.6476     0.6476
      OAL       46.2258    46.2258
      PARAXIAL IMAGE
         HT      0.0000     0.0000
         THI     1.0104     1.0572
         ANG     0.0000     0.0000
      ENTRANCE PUPIL
         DIA     1.4852     1.4852
         THI     0.0000     0.0000
      EXIT PUPIL
         DIA     0.0731     0.0731
         THI     0.0133     0.0133
         STO DIA 1.2780     1.2724
CODE V> out t
```

The invention claimed is:

1. An optical system for reformatting an image, comprising:
   at least one optical subsystem having a plurality of planar optical elements optically coupled to a line image, the at least one optical subsystem (i) segmenting the line image into a plurality of image segments, each image segment being of a predetermined segment length and located at a respective original position in the line image, and (ii) reimaging each of the image segments onto at least one image cell in accordance with the original position of the image segments in the line image.

2. The optical system of claim 1 wherein the image cells are arranged into an array of image cells.

3. The optical system of claim 2 wherein each image cell contains a plurality of detector cells in a detector array.

4. The optical system of claim 1 wherein the image cells form an imaging spectrometer, each image segment being reimaged to a plurality of imaging cells in accordance with the wavelengths of light in the image segments.

5. The optical system of claim 1 wherein there are a plurality of sequential line images, further comprising a data processor coupled to the image cells to perform Time Delay and Integration on the line images.

6. The optical system of claim 1 wherein the planar optical elements include a binary optic element.

7. The optical system of claim 1 wherein the planar optical elements include a prism.

8. The optical system of claim 1 further comprising an image source subsystem for imaging light from a view to form the line image.

9. The optical system of claim 1 further comprising an optical combiner to direct the reimaged line segments through a common exit pupil of the system.

10. The optical system of claim 1 further comprising at least one image corrector optically coupled to the planar optical elements to correct for image degradation introduced by the planar optical elements.

11. An optical system for reformatting an image, comprising:
   a first optical subsystem optically coupled to a line image for segmenting the line image into a plurality of image segments, each image segment located at an original position in the line image, the image segments being of a first length;
   an array of detector cells arranged into rows; and
   a second optical subsystem having a plurality of planar optical reimaging elements optically coupled to the first optical subsystem for reimaging each of the image segments through a select reimaging element onto at least one row of detector cells in accordance with the original position of the image segments in the line image, each detector cell being of a second length.

12. The optical system of claim 11 wherein the reimaging elements include a binary optic element.

13. The optical system of claim 11 wherein the reimaging elements include a prism.

14. The optical system of claim 11 wherein the array of detector cells forms an imaging spectrometer, each image segment being reimaged to a plurality of rows of detector cells in accordance with the wavelengths of light in the image segments.

15. The optical system of claim 11 wherein there are a plurality of sequential line images, further comprising a data processor coupled to the array of detector cells to perform Time Delay and Integration on the line images.

16. The optical system of claim 11 wherein the line image contains more than about one thousand pixels.

17. The optical system of claim 16 wherein the line image contains about six thousand pixels.

18. The optical system of claim 11 wherein the first optical subsystem comprises a plurality of planar optical segmenting elements which separate the light from the line image into image segments.

19. The optical system of claim 18 wherein the segmenting elements include a binary optic element.

20. The optical system of claim 18 wherein the segmenting elements include a prism.

21. The optical system of claim 11 further comprising an image source subsystem for imaging light from a view to form the line image.

22. The optical system of claim 11 further comprising a image combiner to direct the reimaged line segments through a common exit pupil of the system.

23. A method of optically reformatting a line image comprising the steps of:
   optically coupling at least one optical subsystem having a plurality of planar optical elements to the line image;
   in the optical subsystem, segmenting a line image into a plurality of image segments located at an original position in the line image, the segments being of a predetermined segment length;
   and
   in the optical subsystem, reimaging each of the image segments from the line image onto at least one image cell in accordance with the original position of the image segments in the line image.

24. The method of claim 23 wherein the step of reimaging comprises reimaging the image segments onto an array of image cells, each imaging cell having a plurality of detector cells.

25. The method of claim 23 further comprising the step of spectral analyzing the reimaged image segments.

26. The method of claim 23 further comprising the step of time delaying and integrating image data from a plurality of sequential line images.

27. The method of claim 23 wherein the step of segmenting comprises separating the image segments from the line image using a plurality of planar optical segmenting elements.

28. The method of claim 23 further comprising, before the step of segmenting, the step of imaging light from a view through an image source subsystem to form the line image.

29. The method of claim 23 further comprising the step of directing each of the reimaged line segments through a common exit pupil of the system.

30. The method of claim 23 further comprising the steps of:
   optically coupling an image corrector to the planar optical elements; and
   in the image corrector, correcting image degradation introduced by the planar optical element.

31. A method of optically reformatting a line image comprising the steps of:
   optically coupling a first optical subsystem to the line image;
   in the first optical subsystem, segmenting a line image into a plurality of image segments located at an original position in the line image, the segments being of a first length;
   providing an array of detector cells having rows of detector cells;

optically coupling a second optical subsystem having a plurality of planar optical reimaging elements to the first optical subsystem; and in the second optical subsystem, reimaging each of the image segments from the line image through a select reimaging element onto at least one row of detector cells in accordance with the original position of the image segments in the line image.

32. The method of claim 31 further comprising the step of spectral analyzing the reimaged image segments.

33. The method of claim 31 further comprising the step of time delaying and integrating image data from a plurality of sequential line images.

34. The method of claim 31 wherein the step of segmenting comprises separating the image segments from the line image using a plurality of planar optical segmenting elements.

35. The method of claim 31 further comprising, before the step of segmenting, the step of imaging light from a view through an image source subsystem to form the line image.

36. The method of claim 31 further comprising the step of directing each of the reimaged line segments through a common exit pupil of the system.

37. An optical system for reformatting an image, comprising:

an image source subsystem having a lens for imaging light from a view to form a line image of light bundles; and an optical subsystem optically coupled to the image source subsystem for (i) segmenting the light bundles of the line image into a plurality of image segments, each image segment being of a predetermined length and located at a respective original position in the line image, and (ii) reimaging each of the image segments onto at least one image cell in accordance with the original position of the image segments in the line image.

38. The optical system of claim 37 wherein the optical subsystem comprises:

a first optical subsystem optically coupled to the image source subsystem to segment light bundles of the line image; and a second optical subsystem optically coupled to the first optical subsystem to reimage the image segments.

39. The optical system of claim 38 wherein the first optical subsystem includes a plurality of planar optical segmenting elements optically coupled to the line image for separating the light bundles of the line image into a plurality of image segments, each segmenting element dedicated to a respective image segment.

40. The optical system of claim 38 wherein the second optical subsystem includes a plurality of planar optical reimaging elements, each of the image segments being reimaged through a respective reimaging element.

41. The optical system of claim 37 wherein there are a plurality of sequential line images, further comprising a data processor coupled to the image cells to perform Time Delay and Integration on the line images.

42. The optical system of claim 37 wherein the image cells form an imaging spectrometer, each image segment being reimaged to a plurality of image cells in accordance with the wavelengths of light in the light bundles.

43. The optical system of claim 37 further comprising an image combiner to direct each reimaged line segment through a common exit pupil of the system.

44. The optical system of claim 43 further comprising a cold stop disposed at the common exit pupil to inhibit spurious thermal energy.

45. A method for reformatting an image, comprising the steps of:

imaging light from a view through a lens of an image source subsystem to form a line image of light bundles;

optically coupling an optical subsystem to the image source subsystem;

in the optical subsystem, segmenting the light bundles of the line image into a plurality of image segments, each image segment being of a predetermined length and located at a respective original position in the line image; and in the optical subsystem, reimaging each of the image segments onto at least one image cell in accordance with the original position of the image segments in the line image.

46. The method of claim 45 wherein the step of optically coupling the optical subsystem comprises:

optically coupling a first optical subsystem to the image source subsystem to segment the light bundles of the line image; and optically coupling a second optical subsystem to the first optical subsystem to reimage the image segments.

47. The method of claim 46 wherein the step of optically coupling the first optical subsystem includes:

providing a plurality of planar optical segmenting elements for separating the light bundles of the line image into a plurality of image segments; and optically coupling the segmenting elements to the line image such that each segmenting element is dedicated to a respective image segment.

48. The method of claim 46 wherein the step of optically coupling the second optical subsystem includes:

providing a plurality of planar optical reimaging elements; and reimaging each of the image segments through a respective reimaging element.

49. The method of claim 45 further comprising the steps of:

providing a plurality of sequential line images;

coupling a data processor to the image cells; and in the data processor, performing Time Delay and Integration on the line images.

50. The method of claim 45 further comprising the steps of:

forming an imaging spectrometer from a plurality of image cells; and reimaging each image segment to the imaging cells in accordance with the wavelengths of light in the light bundles.

51. The method of claim 45 further comprising the step of directing the reimaged line segments through a common exit pupil of the system.

52. The method of claim 51 further comprising the step of disposing a cold stop at the common exit pupil.

* * * * *